(12) United States Patent
Archer et al.

(10) Patent No.: US 10,938,069 B2
(45) Date of Patent: Mar. 2, 2021

(54) DENDRITE INHIBITING ELECTROLYTES FOR METAL-BASED BATTERIES

(71) Applicant: Cornell University, Ithaca, NY (US)

(72) Inventors: Lynden A. Archer, Ithaca, NY (US); Tomas Arias, Auburn, NY (US); Yingying Lu, Ithaca, NY (US); Zhengyuan Tu, Jiangxi (CN); Deniz Gunceler, Istanbul (TR); Snehashis Choudhury, Kolkata (IN)

(73) Assignee: Cornell University, Ithaca, NY (US)

( * ) Notice: Subject to any disclaimer, the term of this patent is extended or adjusted under 35 U.S.C. 154(b) by 457 days.

(21) Appl. No.: 15/128,635

(22) PCT Filed: Mar. 24, 2015

(86) PCT No.: PCT/US2015/022157
§ 371 (c)(1),
(2) Date: Sep. 23, 2016

(87) PCT Pub. No.: WO2015/148450
PCT Pub. Date: Oct. 1, 2015

(65) Prior Publication Data
US 2017/0179532 A1    Jun. 22, 2017

Related U.S. Application Data

(60) Provisional application No. 62/090,585, filed on Dec. 11, 2014, provisional application No. 61/969,433, filed on Mar. 24, 2014.

(51) Int. Cl.
*H01M 2/16*  (2006.01)
*H01M 4/38*  (2006.01)
(Continued)

(52) U.S. Cl.
CPC ...... *H01M 10/0568* (2013.01); *H01M 2/1686* (2013.01); *H01M 4/38* (2013.01);
(Continued)

(58) Field of Classification Search
CPC ...... H01M 2/166; H01M 2/1686; H01M 4/38; H01M 4/381; H01M 4/382; H01M 10/052;
(Continued)

(56) References Cited

U.S. PATENT DOCUMENTS

6,117,591 A      9/2000  Takeuchi et al.
2008/0171268 A1*  7/2008  Yazami ................ H01M 6/168
                                              429/341
(Continued)

FOREIGN PATENT DOCUMENTS

CN    101523644 A    9/2009
CN    102651466 A    8/2012
(Continued)

OTHER PUBLICATIONS

Takehara, Z.I., Future prospects of the lithium metal anode, Journal of Power Sources, Sep. 1, 1997, vol. 68, No. 1, pp. 82-86.

*Primary Examiner* — Brittany L Raymond
(74) *Attorney, Agent, or Firm* — Hodgson Russ LLP

(57) ABSTRACT

A metal-based battery includes at least one metal electrode immersed within an electrolyte that includes: (1) an aprotic solvent; (2) a simple halogen containing material; and (3) optionally a metal salt that includes a complex halogen containing anion. The simple halogen containing material may include a metal halide salt that includes a metal cation selected from the group including but not limited to lithium and sodium metal cations. The metal halide salt may also include a halide anion selected from the group consisting of fluoride, chloride, bromide and iodide halide anions. The use (Continued)

of the metal halide salt within the metal-based battery provides enhanced cycling ability within the metal-based battery. Also contemplated are additional simple halogen containing material additives that may enhance cycling performance of a metal-based battery.

43 Claims, 17 Drawing Sheets

(51) Int. Cl.
    *H01M 10/052*     (2010.01)
    *H01M 10/054*     (2010.01)
    *H01M 10/0567*     (2010.01)
    *H01M 10/0568*     (2010.01)
    *H01M 10/0569*     (2010.01)

(52) U.S. Cl.
    CPC ........... *H01M 4/381* (2013.01); *H01M 4/382* (2013.01); *H01M 10/052* (2013.01); *H01M 10/054* (2013.01); *H01M 10/0567* (2013.01); *H01M 10/0569* (2013.01); *H01M 2/166* (2013.01); *H01M 2300/0025* (2013.01); *Y02T 10/70* (2013.01)

(58) Field of Classification Search
    CPC ........... H01M 10/054; H01M 10/0567; H01M 10/0568; H01M 10/0569; H01M 2300/0025; Y02T 10/7011
    See application file for complete search history.

(56) References Cited

U.S. PATENT DOCUMENTS

| | | | | |
|---|---|---|---|---|
| 2014/0272526 A1* | 9/2014 | Huang | ................. | H01M 2/145 |
| | | | | 429/144 |
| 2015/0037690 A1* | 2/2015 | Dalavi | ............. | H01M 10/0567 |
| | | | | 429/331 |
| 2015/0064568 A1* | 3/2015 | Yushin | ............. | H01M 10/0525 |
| | | | | 429/233 |
| 2015/0357646 A1* | 12/2015 | Lu | ....................... | H01M 4/0452 |
| | | | | 429/199 |

FOREIGN PATENT DOCUMENTS

| | | |
|---|---|---|
| CN | 102723527 A | 10/2012 |
| JP | 2000-182664 A | 6/2000 |
| JP | 2004-207210 A | 7/2004 |
| JP | 2012-113842 A | 6/2012 |
| JP | 2013-037993 A | 2/2013 |

\* cited by examiner

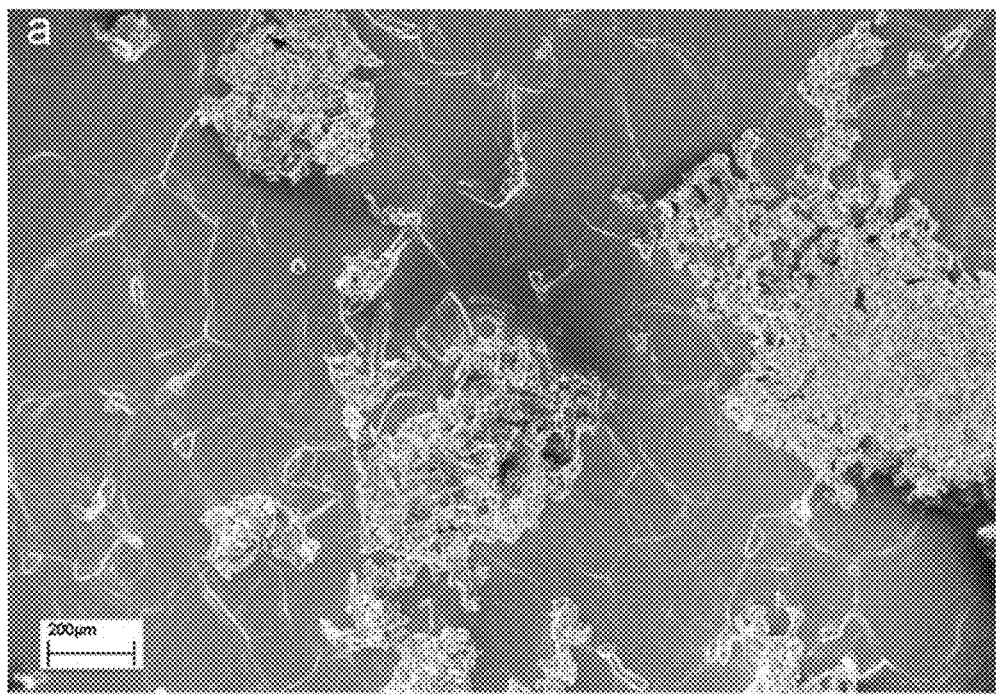
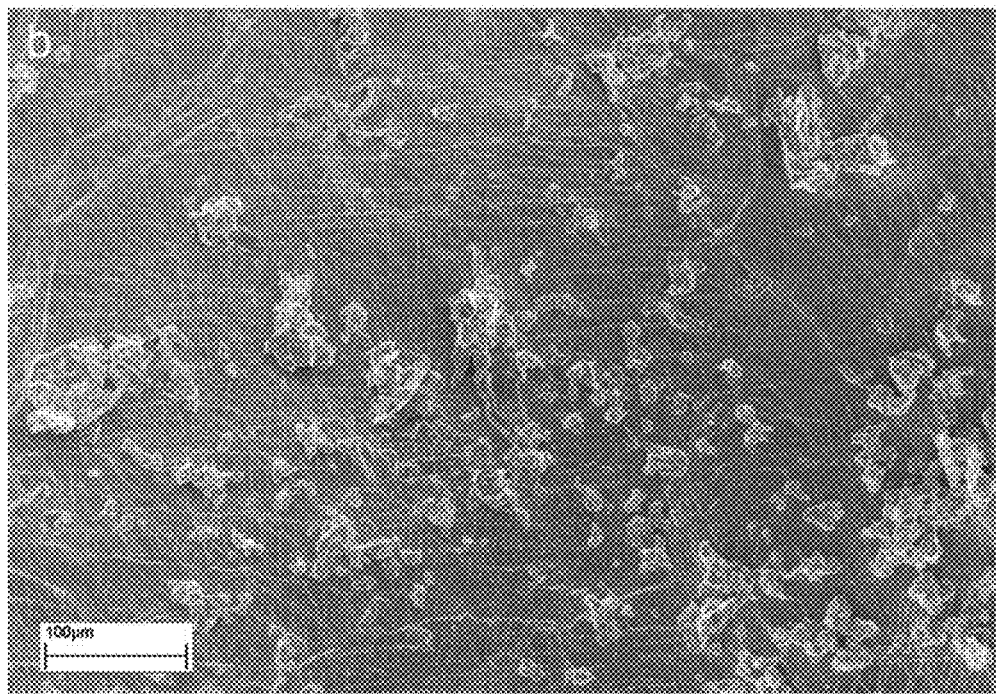
Figure 13

Table 1

| Sample | $\theta(°)$ | $\cos(\theta)$ | Electrolyte surface tension($N\ m^{-1}$) | Liquid-solid surface energy($J\ m^{-2}$) |
|---|---|---|---|---|
| Pure PC | 23.0 | 0.92 | 0.0448 | 0.479 |
| Pure DMC | 7.3 | 0.99 | 0.0291 | 0.491 |
| PC/1M LiTFSI | 22.0 | 0.93 | 0.0426 | 0.480 |
| 5 mol% LiF | 19.5 | 0.94 | 0.0403 | 0.482 |
| 10 mol% LiF | 18.5 | 0.95 | 0.0381 | 0.484 |
| 30 mol% LiF | 16.0 | 0.96 | 0.0358 | 0.486 |
| 50 mol% LiF | 15.0 | 0.97 | 0.0336 | 0.487 |
| Li: 0.52 $J\ m^{-2}$; PC: 0.045 $N\ m^{-1}$; DMC: 0.0286 $N\ m^{-1}$ | | | | |

Figure 14

Table 2

| Sample | VFT: $\sigma = A\exp(-B/(T-T_0))$ | | | $T_{sc} = CJ^{-m}$ |
|---|---|---|---|---|
| | $A(S/cm)$ | $B(K)$ | $T_0(K)$ | $m$ |
| 0.1 mol% LiF | 0.081±0.0029 | 461±12 | 162±2.1 | - |
| 1 mol% LiF | 0.079±0.0011 | 485±5.1 | 156±0.88 | - |
| 3 mol% LiF | 0.035±0.0028 | 291±22 | 188±4.9 | - |
| 5 mol% LiF | - | - | - | 1.42 |
| 10 mol% LiF | 0.033±0.0085 | 365±8.1 | 168±1.7 | 1.53 |
| 30 mol% LiF | 0.0061±0.00097 | 127±32 | 215±12 | 1.70 |
| 100 mol% LiF | 0.00052±0.000030 | 506±21 | 138±3.8 | |
| 30 mol% LiF @ 70°C | - | - | - | 0.60 |
| 30 mol% LiCl | - | - | - | 1.36 |
| 30 mol% LiBr | - | - | - | 2.10 |
| 30 mol% LiI | - | - | - | 1.27 |

Figure 15

DENDRITE INHIBITING ELECTROLYTES FOR METAL-BASED BATTERIES

CROSS-REFERENCE TO RELATED APPLICATIONS

The present application claims priority to and the benefit of U.S. provisional patent application No. 61/969,433, filed on Mar. 24, 2014 and U.S. provisional patent application No. 62/090,585, filed Dec. 11, 2014, the entire contents of which are hereby incorporated by reference.

STATEMENT OF GOVERNMENT INTEREST

This invention was made with government support under Grant Numbers DE-SC0001086 & DE-AR0000750 awarded by the Department of Energy. The United States Government has certain rights in the invention.

BACKGROUND

1. Field

Embodiments relate generally to stable metal electrodeposition (especially as related to, but not limited to, electrodeposition of lithium metal, sodium metal and other metals, such other metals including but not limited to aluminum metal, magnesium metal and zinc metal). More particularly, exemplary embodiments relate to stable lithium metal and sodium metal (and by extension other metal) electrodeposition from liquid electrolytes alone, and liquid electrolytes infused into nanoporous separators.

2. Description of the Related Art

Rechargeable lithium and sodium metal-based batteries are among the most versatile battery platforms for high-energy, cost-effective electrochemical energy storage. Non-uniform metal deposition and dendrite formation on the negative electrode anode during repeated cycles of charge and discharge is a major hurdle to commercialization of energy storage technology based on each of these chemistries. A long held view is that unstable electrodeposition is a consequence of inherent characteristics of these metals and their inability to form uniform electrodeposits on surfaces with inevitable defects.

Given the significance of batteries in various applications, including in particular metal-based batteries, desirable are battery improvements for lithium, sodium and other metal-based batteries that provide stable and superior battery performance while addressing dendrite growth considerations.

SUMMARY

In accordance with the embodiments, it is newly believed that such unstable electrodeposition of lithium, sodium and other metals within metal-based batteries is strongly related to the properties of a so-called solid electrolyte interface (SEI) layer formed on, for example, a lithium metal surface or a sodium metal surface at an initial stage of metal-based battery operation by chemical and electrochemical reactions with electrolyte components. In accordance with the embodiments, a well-defined SEI layer is thought to be advantageous for its ability to guide stable and even deposition by controlling the rate of metal ion migration and the distributing of the metal ion flux near a metal electrode anode surface.

The exemplary embodiments provide a lithium metal battery and a sodium metal battery in which simple halogen containing salts of either metal are introduced into a liquid electrolyte to form a salt-rich SEI layer on the metal electrode anode, which facilitates uniform electrodeposition of the metal on the metal electrode anode. The embodiments also concern electrolytes for sodium metal and lithium metal batteries in which the solubility of the simple metal halogen electrolyte salt is limited to facilitate formation of a salt-rich SEI layer. The simple metal halogen electrolyte salt additives can be substantially insoluble (i.e., less than about 20 mole percent), partially soluble (i.e., from greater than about 20 mole percent to less than about 80 mole percent) or substantially soluble (i.e., greater than about 80 mole percent) in a selected aprotic solvent in accordance with the embodiments. The advantages of using such an electrolyte and such a related method in accordance with the embodiments are three-folded: 1) the electrolyte in accordance with the embodiments provides for avoidance of possible exposure of a reactive metal anode in an ambient environment; 2) the simple halogen containing material additives in accordance with the embodiments are constantly present in the electrolyte allowing repair of the SEI for long-term effectiveness of a resulting metal-based battery; and 3) a method in accordance with the embodiments does not require any pre-treatment of a metal-based battery anode and is easy to integrate with normal battery manufacturing processes.

In general, the embodiments realize the forgoing objects by use of functional additives, especially simple halogen containing material salts, for example (but not limited to), metal halide salts, as part of the operation of an electrochemical cell, such as a secondary battery (e.g., a lithium metal-based battery a sodium metal-based battery or another metal-based battery). Notably, the embodiments also have utility in other collaterally related aspects of metal-based battery operation, such as increased safety of metal-based battery operation.

The embodiments relate to electrodeposition of metals such as but not limited to lithium, sodium, aluminum, magnesium and zinc in simple liquid electrolytes and in nanoporous solid composite separators infused with liquid electrolytes (which might be described as a composite electrolyte). Simple liquid electrolytes reinforced with simple additives, such as metal halide halogenated salt blends, exhibit stable long-term cycling at room temperature, often with no signs of deposition instabilities over hundreds of cycles of charge and discharge and thousands of operating hours. These observations are rationalized with the help of surface energy data for an electrolyte/metal electrode interface and impedance analysis of the interface under the influence, in particular, of metal halide salt additives during different stages of metal-based electrochemical cell operation. These findings provide support for correlating theoretical predictions that the surface mobility of lithium or sodium is significantly enhanced in the presence of modifiers, such as metal halide salts. Embodied battery cycling observations are consistent with these theoretical models insofar as enhanced surface mobility of lithium or sodium at the interface of an electrolyte and a lithium metal electrode or a sodium metal electrode can enable more stable re-deposition of metal material onto the metal electrode, thereby mitigating dendrite formation. More generally, a theory in accordance with the embodiments shows that surface diffusion is particularly fast on compounds which crystallize in a rock salt structure. Therefore, one may expect, and herewith teach, that any additive that encourages growth of an ionic compound of the depositing metal, and for which that ionic compound forms in the rock salt structure, will enable this beneficial, fast surface diffusion, and thereby mitigate dendrite growth. Those additives which will produce such rock salt-structured ionic compounds with metals of interest are listed specifically within the Detailed Description of the Non-Limiting Embodiments.

In the broadest sense, one may expect that any additive which encourages growth on the electrode of a compound for which surface diffusion of the depositing metal is particularly fast will engender these beneficial, re-deposition, dendrite mitigating effects to the system. Those compounds for which surface diffusion of the depositing metal is fast may be determined by those skilled in the relevant arts, for example, of solid state chemistry or solid state physics.

Non-limiting embodiments include: (1) an electrolyte for an electrochemical cell, in which metal electrodeposition occurs and in which dendrite formation is desirably mitigated (e.g., lithium, sodium, aluminum, magnesium and zinc), that is partially comprised of an ionic compound of that metal on which the metal itself has fast surface diffusion; (2) a battery electrolyte comprised at least partially of lithium halide salt additives; (3) a battery electrolyte that includes lithium halide salt additives and nanoporous solids having a pore size less than about 250 nanometers (alumina-PVDF membrane); (4) a battery that includes the battery electrolyte composition that includes at least one of lithium halide salt additives and nanoporous solids (alumina-PVDF membrane).

Further clarification of these embodiments is provided by the following, non-limiting, description. The battery electrolyte in accordance with the embodiments includes a metal halide salt that includes at least one of lithium fluoride, lithium chloride, lithium bromide, and lithium iodide. Alternatively, the embodiments may include a metal halide salt selected from the group consisting of fluoride, chloride, bromide and iodide salts of sodium, aluminum, magnesium and zinc. The battery electrolyte can also include another lithium (or other metal) salt. The lithium (or other metal) salt may include the lithium bis(trifluoromethanesulfonyl)imide (LITFSI) or lithium hexafluorophosphate ($LiPF_6$), but such is not a requirement of the embodiments.

The battery electrolyte of this particular embodiment includes lithium halide salt additives and nanoporous solids (alumina-PVDF membrane) that includes at least one of lithium fluoride, lithium chloride, lithium bromide, and lithium iodide. The battery electrolyte also includes a type of organic-inorganic composite laminated separator for lithium ion/metal batteries, and more specifically, to a sandwich-type tri-layer separator. The two external polymer layers are compatible with electrolyte solution and electrodes. The internal layer is inorganic membrane with uniform nanoporous structure. The battery electrolyte can also include another lithium salt. The lithium salt may include the lithium bis(trifluoromethanesulfonyl)imide (LITFSI) or lithium hexafluorophosphate ($LiPF_6$), but such is not a requirement of the embodiments. The battery includes the foregoing battery electrolyte.

The battery electrolyte composition in accordance with this particular embodiment provides superior performance of a battery, which utilizes the battery electrolyte composition insofar as the battery electrolyte composition in accordance with this particular embodiment mitigates lithium dendrite growth and reinforces the stability of electrodeposition.

A particular composition that may serve as a battery electrolyte in accordance with the embodiments includes an aprotic solvent. This particular composition also includes a simple halogen containing material. This particular composition also includes a metal salt that includes a complex halogen containing anion.

A particular rechargeable battery in accordance with the embodiments includes at least one metal electrode. This particular battery also includes an electrolyte including: (1) an aprotic solvent; and (2) a simple halogen containing material.

A particular method in accordance with the embodiments includes discharging a secondary battery comprising: (1) at least one metal electrode; and (2) an electrolyte comprising: (a) an aprotic solvent; and (b) a simple halogen containing material, to provide a discharged secondary battery. This particular method also includes recharging the discharged secondary battery to provide a recharged secondary battery absent dendrite formation at the at least one metal electrode.

Within the embodiments as described below, and also within the claims, a "simple halogen containing material" is intended as including at least two atoms or ions including at least one halogen atom or ion, but not including more than two types of atoms or ions.

Within the embodiments as described below, and also within the claims, a "metal salt that includes a complex halogen containing anion" is intended as a metal salt that includes at least one cation and an anion including at least two types of atoms to thus provide at least three types of atoms.

BRIEF DESCRIPTION OF THE DRAWINGS

The objects, features and advantages of the embodiments are understood within the context of the Detailed Description of the Non-limiting Embodiments, as set forth below. The Detailed Description of the Non-limiting Embodiments is understood within the context of the accompanying drawings, that form a material part of this disclosure, wherein:

FIG. 13: Post-mortem SEM images of the lithium negative electrodes after galvanostatic polarization measurement. a. at fixed current density of 0.082 mA cm$^{-2}$. b. at fixed current density of 0.06 mA cm$^{-2}$.

FIG. 14: (Table 1): Contact angles, liquid electrolyte surface tensions ($\gamma_L$), lithium surface energy ($\gamma_S$) and solid/liquid interfacial energies ($\gamma_{SL}$) of various electrolyte compositions.

FIG. 15: (Table 2): VFT fitting parameters and scaling exponent by power law fitting. The fittings of these two equations were conducted by Origin 8.0.

DETAILED DESCRIPTION OF THE NON-LIMITING EMBODIMENTS

Figure 1:
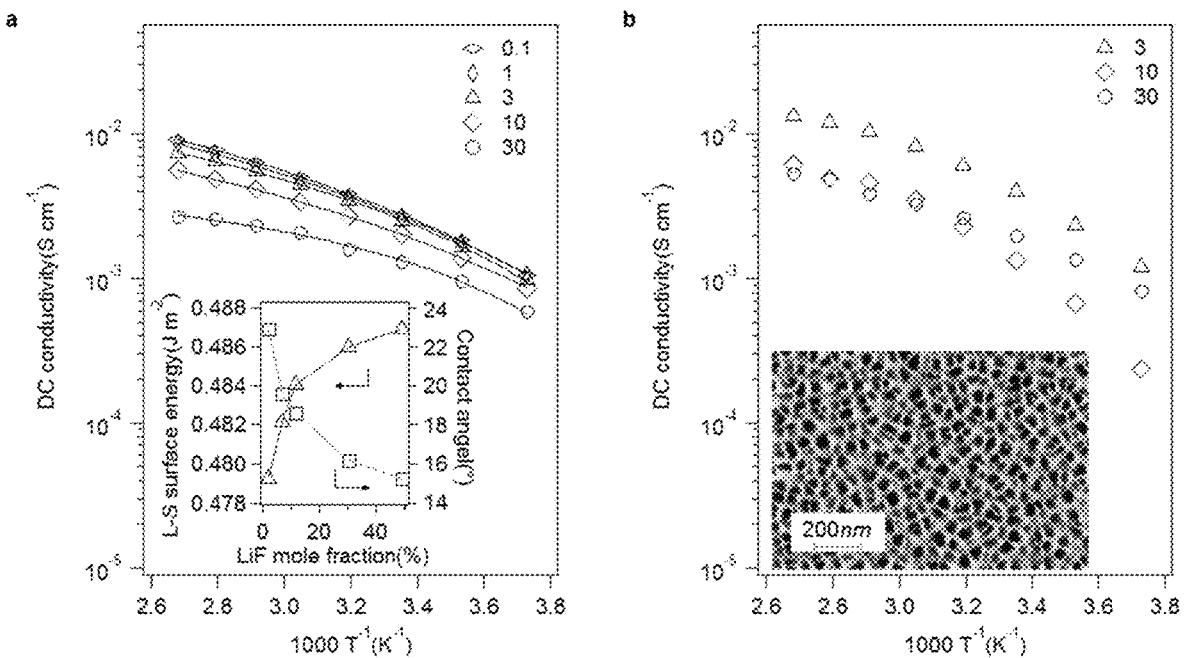
FIG. 1: DC ionic conductivity of LiF+LiTFSI/PC with various LiF mole fractions as a function of temperature. a, Without alumina/PVDF membrane. The solid lines are Vogel-Fulcher-Tammann (VFT) fits for the temperature-dependent ionic conductivity. The parameters from the VFT fitting are shown in FIG. 15 (Table 2). The inset shows the liquid-solid surface energy and contact angle as a function of LiF mole fraction. b, With alumina/PVDF membrane. The SEM image shows the nanostructure of the alumina membrane with pore diameter around 40 nm.

The embodiments provide an electrolyte composition that may be used in a metal-based battery while inhibiting dendrite formation. The electrolyte composition comprises an aprotic solvent and a simple halogen material, and may consist essentially of the aprotic solvent and the simple halogen material. The electrolyte composition may also include a metal salt that includes a complex halogen containing anion. Preferably, the simple halogen material comprises a metal halide salt that includes the same metal as used within a metal electrode whose dendrite formation is inhibited in accordance with the embodiments.

General Considerations

The embodiments provide an electrolyte that may be used in conjunction within a metal electrode within a metal-based battery, and which inhibits dendrite formation on the metal electrode within the metal-based battery, thus providing the metal-based battery with enhanced cycling performance. The embodiments are applicable within the context of metal-based batteries that include at least one metal electrode selected from the group including but not limited to lithium and sodium. As an extension it is also believed that a metal-based battery with inhibited dendrite formation in accordance with the embodiments may also be realized for a metal electrode selected from the group consisting of aluminum, magnesium and zinc.

In accordance with the embodiments, a composition in accordance with the embodiments which may serve as a battery electrolyte that inhibits dendrite formation within a battery in accordance with the embodiments comprises an aprotic solvent. The composition in accordance with the embodiments also includes a simple halogen containing material that is intended to provide a surface-electrolyte interface that inhibits dendrite formation. The composition in accordance with the embodiments may also optionally include a metal salt that includes a complex halogen containing anion.

Within the embodiments, the aprotic solvent is inert with respect to the metal from which is comprised the at least one metal electrode. Further, the aprotic solvent may be, for example, at least one selected from the group including but not limited to 1,4-dioxane, triethylamine (TEA), diisopropylethylamine (DIPEA), 1,2-dimethoxyethane (DME), 1,2-diethoxyethane (DEA), diethyl ether, diglyme, triglyme, tetrahydropyran, diisopropyl ether, methylbutyl ether, tetraglyme, 1,3-dioxolane, tetrahydrofuran (THF), 2-methyl-tetrahydrofuran (2-methyl-THF), 2,2-dimethyltetrahydrofuran (2,2-dimethyl-THF), 2,5-dimethyltetrahydrofuran (2,5-dimethyl-THF), hexamethylphosphoric triamide (HMPA), o-dimethoxybenzene, diethyl carbonate, methyl ethyl carbonate, anisole, dimethyl carbonate, N,N-diethyl-acetamide (DEA) and tetramethylurea (TMU). More preferably, the aprotic solvent is at least one selected from the group including but not limited to ethylene carbonate, propylene carbonate, diethyl carbonate and dimethyl carbonate.

In accordance with the embodiments, the electrolyte composition may include as a simple halogen containing material a metal halide additive selected from the group including but not limited to halides of lithium, sodium, aluminum, magnesium and zinc, where the halides are selected from the group including but not limited to fluorides, chlorides, bromides and iodides. Preferably a metal in the metal electrode for which dendrite formation is inhibited is the same as the metal in the metal halide additive. Typically and preferably the metal halide additive is present at a concentration from about 1 to about 90 mole percent with respect to the aprotic solvent, and more preferably from about 5 to about 40 mole percent with respect to the aprotic solvent.

A metal-based battery in accordance with the embodiments also contemplates an alternative source of a simple halogen containing material than a metal halide material. Such an alternative source of the simple halogen containing material may include, but is not limited to: (1) an elementary diatomic halogen material such as but not limited to $F_2$, $Cl_2$, $Br_2$ and $I_2$; (2) an acid halide material such as but not limited to HF, HCl, HBr and HI; (3) a non-metal halide material such as but not limited to $BCl_3$, $SiF_4$ and $PF_5$; (4) a mixed halogen halide material such as but not limited to $IF_7$; and (5) a noble gas halide material such as but not limited to $XeF_7$.

A metal-based battery in accordance with the embodiments contemplates as a final optional component a metal salt that includes a complex halogen containing anion such as but not limited to lithium bis(trifluoromethanelsulfonyl) imide, lithium tetrafluoroborate and lithium hexafluorophosphate salts. Any one or more of these metal salts that include a complex halogen containing anion is present at a concentration from about 0.1 to about 5 M with respect to the aprotic solvent and more preferably from about 0.5 to about 2 M with respect to the aprotic solvent.

A metal based battery in accordance with the embodiments may employ a counter electrode as is otherwise generally conventional in the art, which need not necessarily comprise a metal electrode. Such alternative counter electrodes include, but are not necessarily limited to porous oxide electrodes and graphite electrodes.

A metal-based battery in accordance with the embodiments may have a cycling ability of at least about 500 cycles and more preferably at least about 1000 cycles. Alternatively a metal based battery in accordance with the embodiments will have an operative lifetime of at least about 500 hours and more preferably at least about 1000 hour. The foregoing cycling ability and operative lifetime performance may be determined within the context of maintenance of at least 90 percent of a metal-based battery capacity.

Experimental Details for Lithium Metal-Based Battery

The following description is for an example lithium metal-based battery embodiments which are meant to illustrate, by example, aspects of these embodiments, but are not intended to limit the scope of these embodiments. These particular embodiments provide a method for stabilizing lithium electrodeposition in common liquid electrolytes reinforced with lithium halide salts for use within a lithium-based battery such as but not limited to a lithium metal battery or a lithium ion battery. Premature cell failure by dendrite growth and proliferation within these embodiments can be essentially eliminated in plate-strip type experiments even at high operating current densities. In more aggressive, high-rate polarization experiments, levels of dendrite suppression in room temperature liquid electrolytes are apparently superior to all previous reports from elevated temperature studies of polymer and other solid-state electrolytes long thought to be essential for developing reliable LMBs. Experimental characterization of the interfacial tension and impedance at the electrolyte-lithium metal interface confirm that the interfacial mobility is a strong decreasing function of lithium halide salt and is the most likely source of the improved stability of Li electrodeposits in liquids.

Figure 2:
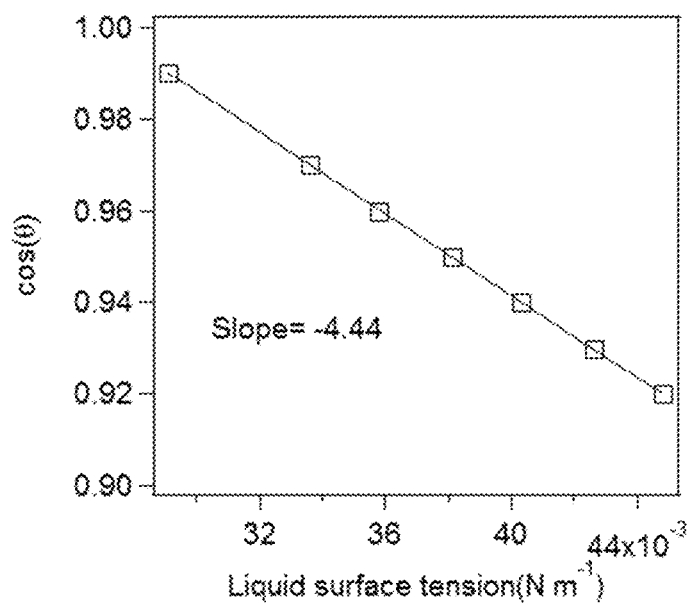
FIG. 2: Zisman's plot (cos θ vs. $\gamma_L$) for LiF+LiTFSI/PC, PC, DMC on lithium metal surface. Based on Zisman approach, the contact angle of different liquids on the same surface is linearly dependent on the liquid surface tension.

For these lithium-based battery embodiments electrolytes containing 1 M $Li^+$ cations were studied in two configurations: (i) In liquid form; and (ii) as liquids infused in nanoporous solids. Electrolytes employed in both situations were created by blending pre-determined amounts of lithium halide salts and lithium bis(trifluoromethanesulfonyl)imide (LiTFSI) in a low volatility propylene carbonate (PC) liquid host. To explore consequences of the observations on lifetime of lithium metal batteries, a small number of studies was performed by using blends of lithium fluoride (LiF) and lithium hexafluorophosphate ($LiPF_6$) in a 50/50 blend of ethylene carbonate (EC) and diethylene carbonate (EC:DEC). Because the most impressive enhancements in interfacial mobility predicted by joint density function theory (JDFT) are for electrolytes containing LiF, this embodiment will focus on these materials. FIG. 1a reports the DC conductivity for LiF+LiTFSI/PC as a function of LiF mole fraction in the electrolytes. It is apparent that at low LiF concentrations, DC conductivities close to the measured values for a LiTFSI/PC liquid electrolyte control are found. At LiF concentrations above 3 mol percent, the conductivity falls with increasing LiF content and the shape of the conductivity-versus-temperature profiles are seen to become flatter, but for all compositions studied, room-temperature conductivity well above $10^{-3}$ S $cm^{-1}$ are observed. A lower bulk electrolyte ionic conductivity upon addition of LiF is consistent with expectations based on the reduced dissociation of the salt, relative to LiTFSI, and consequent lower population of mobile ions in solution. The inset to the figure shows the effect of LiF on the wettability/contact angle (right axis) and surface energy (left axis) of the electrolyte with a lithium metal surface (see FIG. 2 & FIG. 14 (Table 1)). The measurements were performed using a home-built contact angle goniometer enclosed in an argon-filled chamber. It is apparent from the figure that addition of LiF causes a non-monotonic decrease in contact angle and a commensurate rise in interfacial energy. The increase in surface energy produced upon addition of LiF to the electrolytes is therefore many orders of magnitude lower than the differences in bonding energy between Mg—Mg and Li—Li atoms to significantly change the tendency of Li to form lower dimensional dendritic structures.

Figure 3:
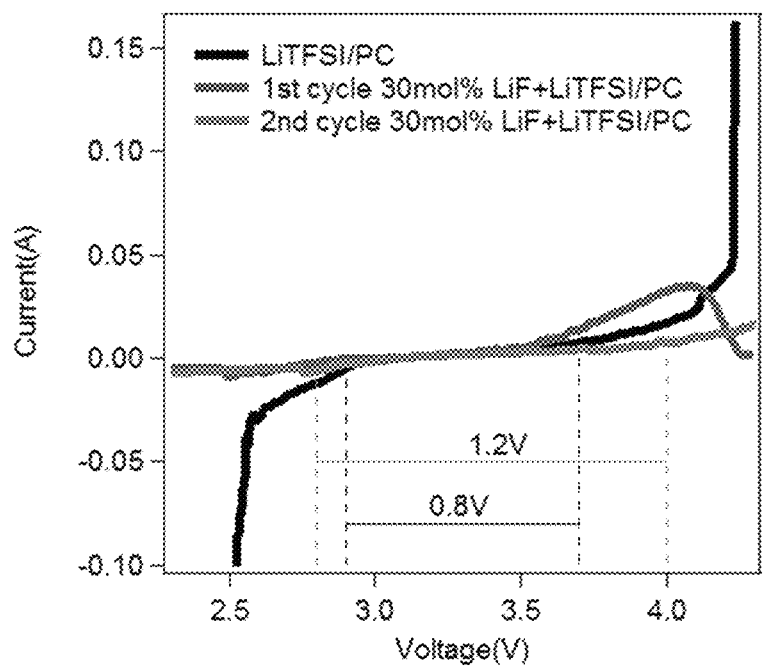
FIG. 3: Electrochemical stability window from cyclic voltammetry measurements for 1M LiTFSI/PC and 30 mol % LiF+LiTFSI/PC at a rate of 0.5 mV $s^{-1}$. The measurements were conducted in symmetric lithium cells.

FIG. 1b reports the DC conductivity for nanoporous solid electrolytes created by infusing LiF+LiTFSI/PC into nanoporous $Al_2O_3$/PVDF monoliths (see lower inset) with a nominal pore diameter of 40 nm. It is apparent from FIG. 1b that while the effect of LiF composition on conductivity is more complex than for the liquid electrolytes, over the range of LiF compositions studied the electrolytes again exhibit room-temperature conductivities above $10^{-3}$ S cm$^{-1}$; underscoring their suitability as room-temperature electrolytes for lithium-based batteries. Electrochemical stability of LiF-containing electrolytes was characterized by cyclic voltammetry and the results reported in FIG. 3. With 30 mol % LiF, the width of electrochemical stability window is observed to increase measurably. The peak in the voltammogram at around 4.1 V vs. Li/Li$^+$ in the first cycle is in fact consistent with formation of a passivation film on the electrode that protects the electrolyte.

Figure 4:
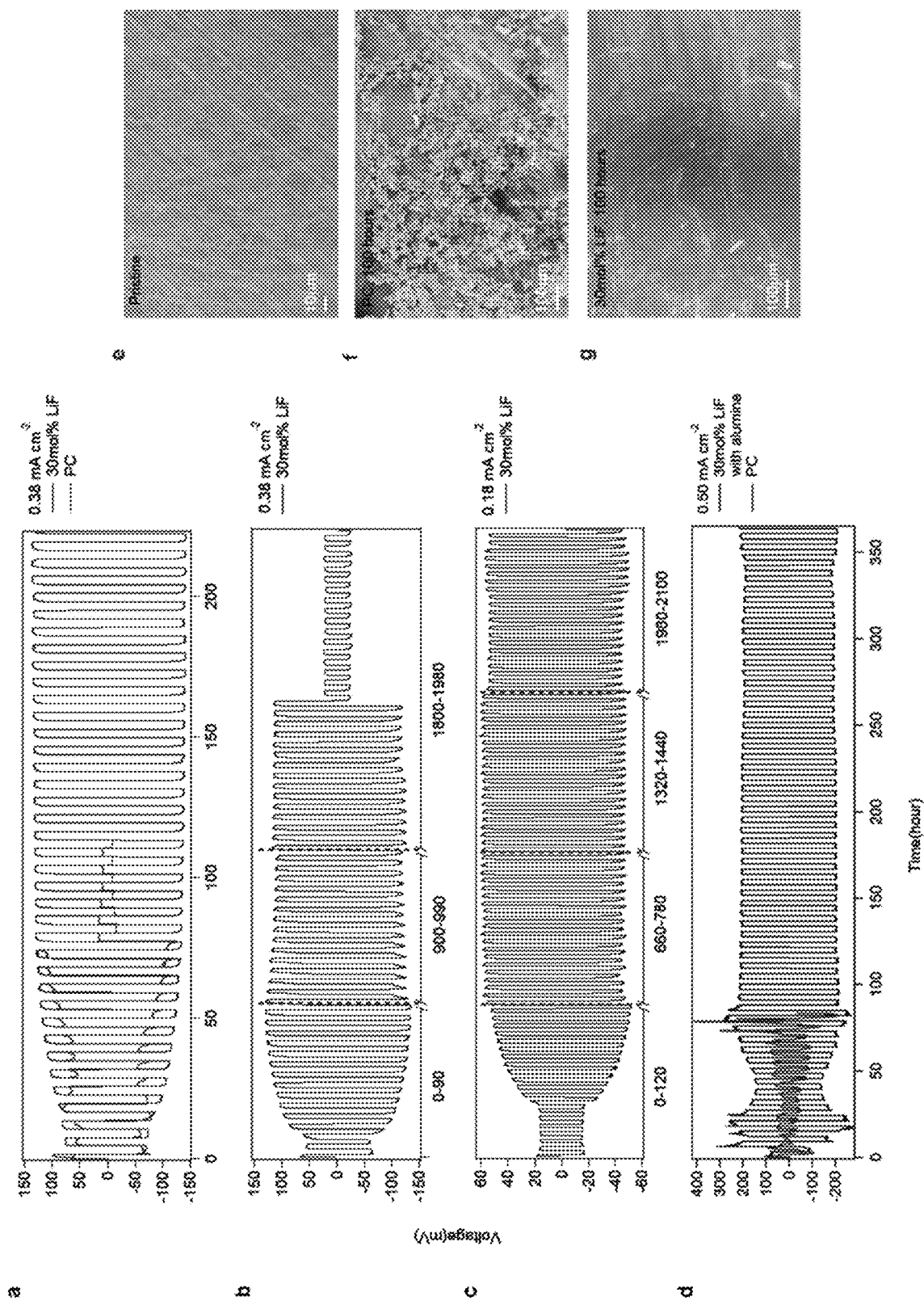
FIG. 4: Voltage versus time for a symmetric lithium cell with each half cycle lasts 3 hours. a, Initial voltage profiles of 30 mol % LiF+LiTFSI/PC (black) and LiTFSI/PC (red) electrolytes at a current density of 0.38 mA $cm^{-2}$. b, Voltage profile of 30 mol % LiF+LiTFSI/PC electrolyte at a current density of 0.38 mA $cm^{-2}$ before observing cell short-circuits. c, Typical voltage profile for LiF+LiTFSI/PC electrolytes at lower current densities (less than 0.2 mA $cm^{-2}$). d, Initial voltage profiles of 30 mol % LiF+LiTFSI/PC (black) and LiTFSI/PC (red) electrolytes with alumina/PVDF membrane at a current density of 0.50 mA $cm^{-2}$. The initial voltage disturbance is due to the electrolyte consumption and SEI layer formation. The voltage reaches a stable plateau after 80 hours and lasts for over 350 hours. Such stable performance at high current density originate from two factors: 1) the LiF additive stabilizes the lithium deposition and forms a flat surface, which are in favor of steady battery usage; 2) the high modulus of alumina separator prevents the dendrite proliferation and avoids the short-circuit. SEM analyses: e, Pristine lithium anode before galvanostatic cycling. f, Lithium anode in contact with LiTFSI/PC electrolyte after 100-hour cycling at 0.38 mA cm$^{-2}$. g, Lithium anode in contact with 30 mol % LiF+LiTFSI/PC electrolyte after 100-hour cycling at 0.38 mA cm$^{-2}$.

The electrodeposition of Li in the liquid and nanoporous LiF+LiTFSI/PC based electrolytes was investigated by using galvanostatic cycling of Li|LiF+LiTFSI/PC|Li symmetric lithium cells in which the lithium striping/plating process is cycled over three-hour charge and discharge intervals designed to mimic operation in a LMB. The cells are configured to ensure that during each three-hour period sufficient lithium is transported between electrodes to create a dendrite bridge in the inter-electrode space to short-circuit the cells. The cells also do not include a separator and, once formed, the only resistance to dendrites bridging the inter-electrode spacing is provided by the intervening liquid electrolyte. FIG. 4a compares the voltage profiles observed in symmetric cells containing electrolytes with and without LiF at a fixed, high current density of 0.38 mA cm$^{-2}$.

The figure shows that cells that do not contain LiF in the electrolyte exhibit a large and irreversible drop in voltage consistent with catastrophic failure by a dendrite-induced short-circuit, in as little as 75 hours of operation (i.e. less than 13 cycles of charge and discharge). In contrast, cells containing 30 mol % LiF in the electrolyte cycle stably for more than 1800 hours (300 cycles of charge and discharge) before succumbing to failure in the same manner. Nearly 25-fold enhancement in cell lifetime is achieved upon addition of LiF to a liquid electrolyte. It is also significant that the current experiments are performed at substantially higher current densities than those reported for solid polymer or ceramic electrolytes and at room temperature. FIG. 4c displays voltage profiles for cycling experiments performed at comparable current densities as in previous studies using polymers and other mechanical agents. Remarkably, even after 2100 hours of continuous operation, the cell shows no evidence of failure. FIG. 4d reports a similar result for cells based on nanoporous membranes infused with liquid electrolytes, but cycled at a very high current density of 0.5 mA cm$^{-2}$. While cells with the control LiTFSI/PC electrolyte are seen to quickly fail, those containing LiF in the electrolyte stabilize over a period of around 75 hours and cycle stably for more than 350 hours.

FIGS. 4e-g are scanning electron micrographs of the lithium metal electrode surface before cycling (e), after 100 hours of cycling in a LiTFSI/PC control electrolyte (f), and after 100 hours of cycling in a LiF+LiTFSI/PC electrolyte containing 30 mol % LiF (g). It is evident from the figure that the improved lifetimes of the cells containing LiF coincides with the observation of virtually pristine Li metal electrodes after extended cycling.

Figure 6:
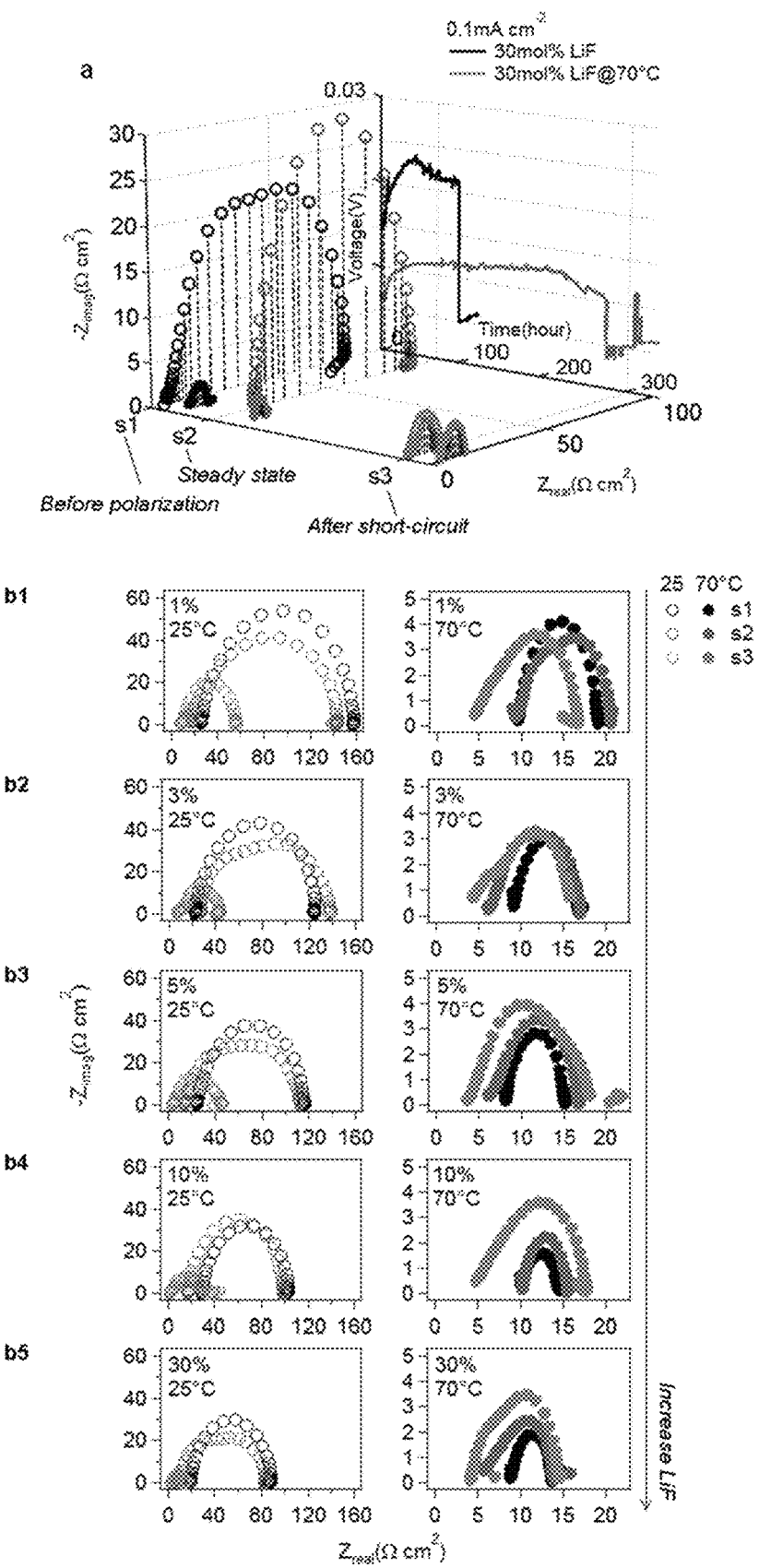
FIG. 6: Voltage profile at a fixed current density, impedance spectra of the three stages (s1: before polarization, s2: steady state, s3: after short-circuit) at 25° C. and 70° C. a, Voltage profiles and impedance spectra at 0.1 mA cm$^{-2}$ for 30 mol % LiF+LiTFSI/PC electrolyte. b, Impedance spectra for 1 mol %, 3 mol %, 5 mol %, 10 mol % and 30 mol % LiF+LiTFSI/PC electrolytes. The impedance spectra with alumina/PVDF separator are reported in FIG. 8.

Unidirectional galvanostatic polarization of symmetric lithium cells provides a convenient, accelerated-testing scheme for assessing the stability of lithium metal electrodes during electrodeposition. In this approach, lithium is continuously stripped from one electrode and plated on the other until the cell fails by consumption of all of the lithium or as a result of a dendrite-induced short-circuit. A constant current density is applied to the cell and the corresponding voltage profile is obtained as a function of time (FIG. 6a). The time ($T_{sc}$) at which a sharp drop-off in the potential is observed provides an estimate for its lifetime. Because there is no pause in the deposition, as occurs when the direction of the current is reversed in the cyclic plate-strip experiment discussed in the last section, there is no opportunity for defects produced by instability in one deposition cycle to heal before they nucleate dendrites that ultimately short circuit the cell.

Figure 5:
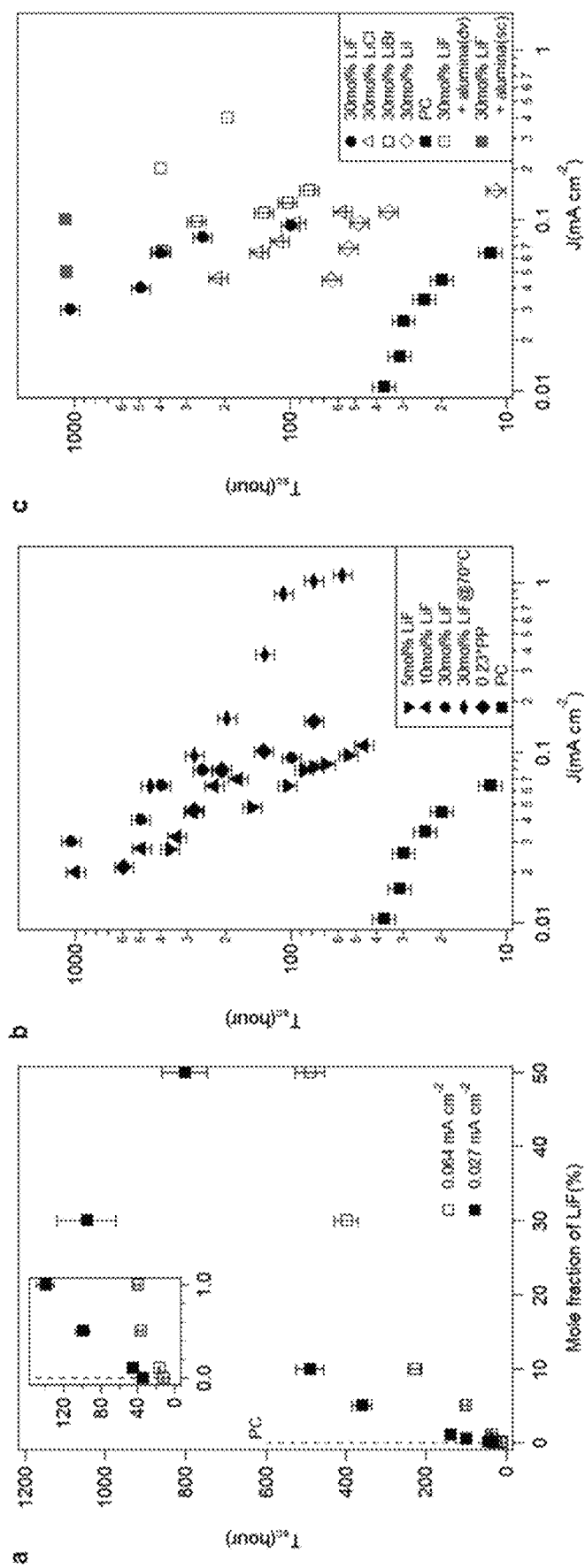
FIG. 5: Short-circuit time $T_{sc}$ from galvanostatic polarization measurements for symmetric lithium cells. a, $T_{sc}$ as a function of LiF mole fraction at 0.027 mA cm$^{-2}$, 0.064 mA cm$^{-2}$. b, $T_{sc}$ as a function of current density J for various LiF concentrations and for PP-TFSI. c, $T_{sc}$ as a function of current density J for different lithium halides with 30 mol % of the halide. The red markers are used to represent results for cells based on nanoporous alumina/PVDF membranes infused with LiF+LiTFSI/PC electrolytes. The filled red symbols indicate the cells that short-circuit while the open red symbols represent the ones that diverge instead of short. Measurements were conducted at room temperature unless indicated.

FIG. 5a reports measured $T_{sc}$ values as a function of LiF concentration in the electrolyte at two current densities. Consistent with the observations reported in the previous section, the figure shows that addition of LiF to a LiTFSI/PC electrolyte produces large increases in cell lifetime. The top inset shows that addition of as little as 1 mol % LiF produces more than a three-fold enhancement in cell lifetime at both low (0.027 mA cm$^{-2}$) and moderate (0.064 mA cm$^{-2}$) current densities. The figure further shows that at a higher LiF contents the relationship between $T_{sc}$ and LiF composition in the electrolyte is nonlinear. At 30 mol % LiF, it is seen that more than a 30-fold enhancement in cell lifetime is achieved at either current density, confirming the earlier observations based on cyclic plate-strip experiments. The ability of LiF salt to extend cell lifetime seems to reach its maximum level at around 30 mol % LiF. For higher LiF mole fraction (50 mol % LiF), there is a decrease of $T_{sc}$, which might be attributed to the low DC conductivity or low mobile ion concentration. It is also difficult to polarize the cell at relatively high current density for the same reason.

Figure 7:
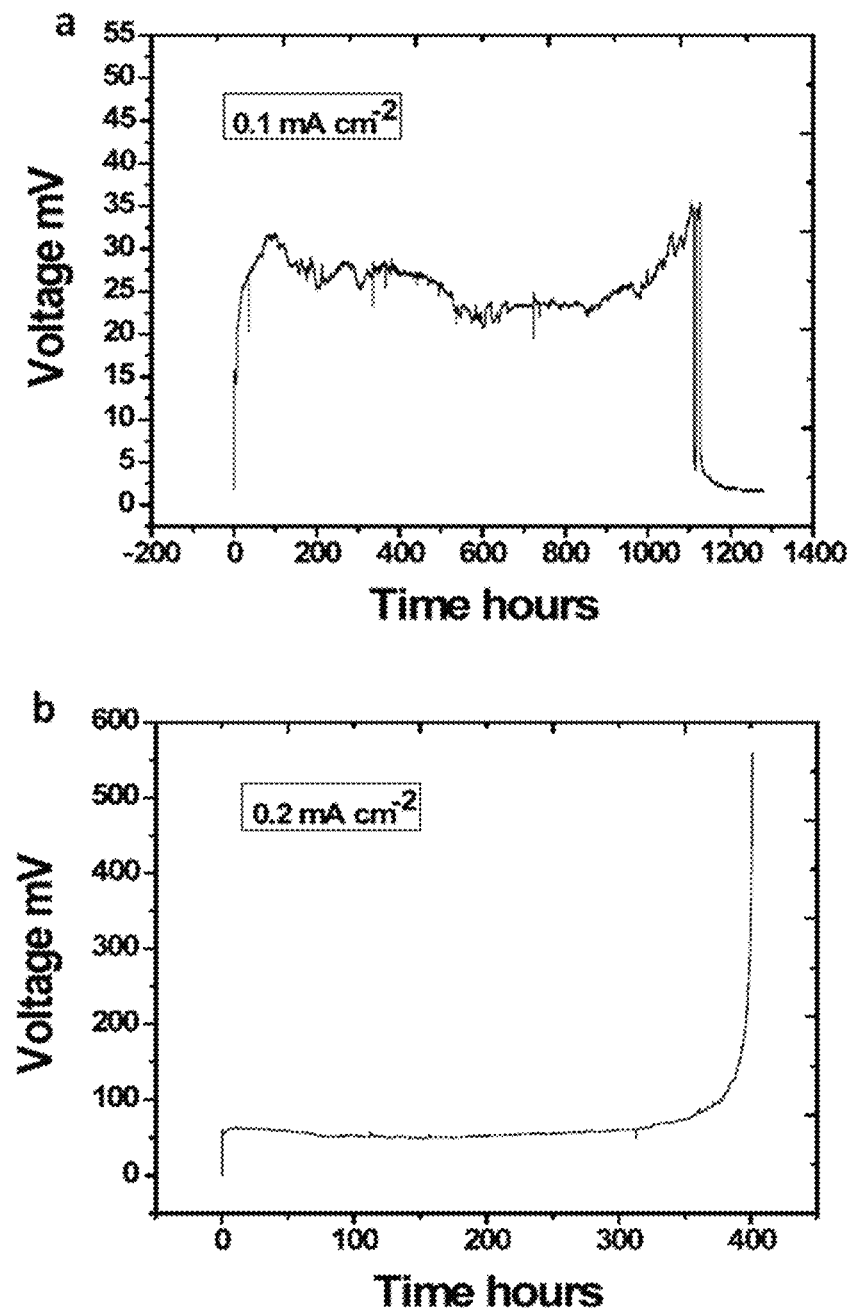
FIG. 7: Potential profile for symmetric lithium cell with 30 mol % LiF+LiTFSI/PC using nanoporous alumina separator. a, potential profile at 0.1 mA cm$^{-2}$. b, potential profile at 0.2 mA cm$^{-2}$.
Figure 8:
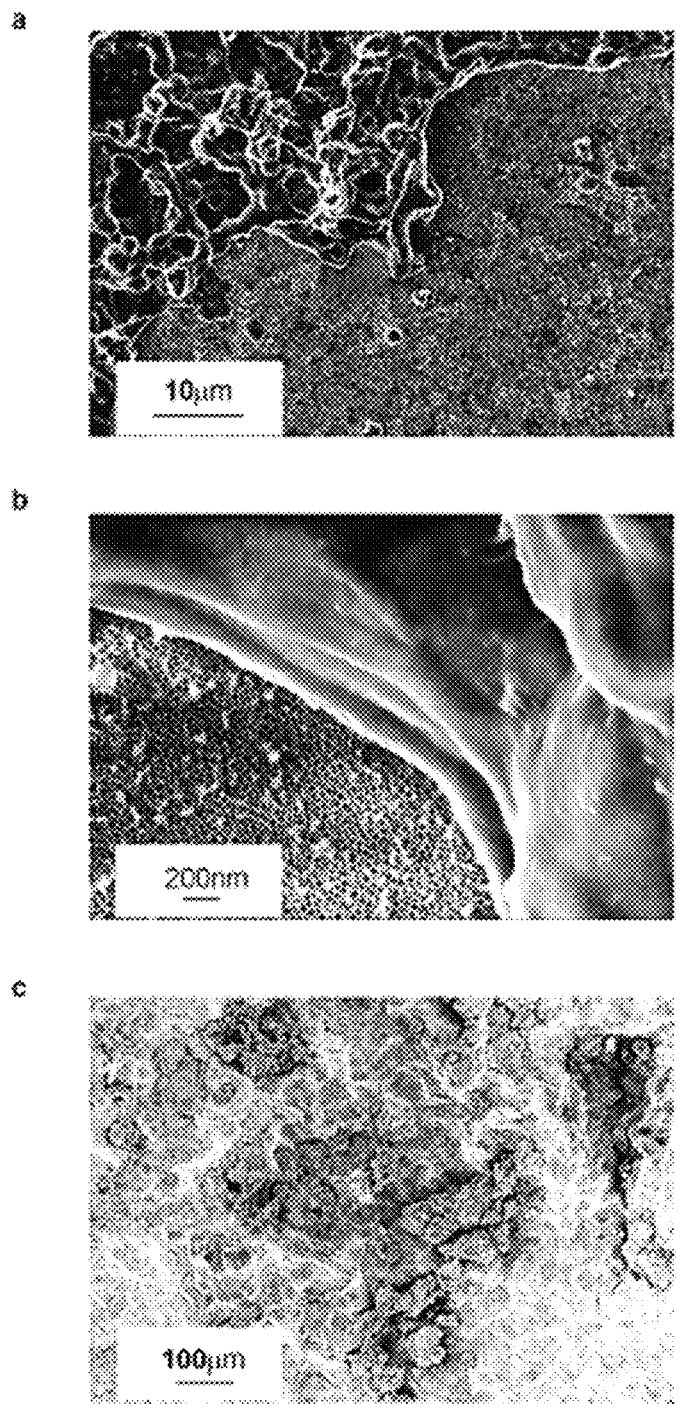
FIG. 8: SEM analysis of alumina/PVDF separator and lithium substrate after 400 hours lithium plating/striping test at 0.5 mA cm$^{-2}$. a, Alumina/PVDF separator with lithium metal on one side. b, Zoom in picture of a. c, Morphology of lithium surface.
Figure 9:
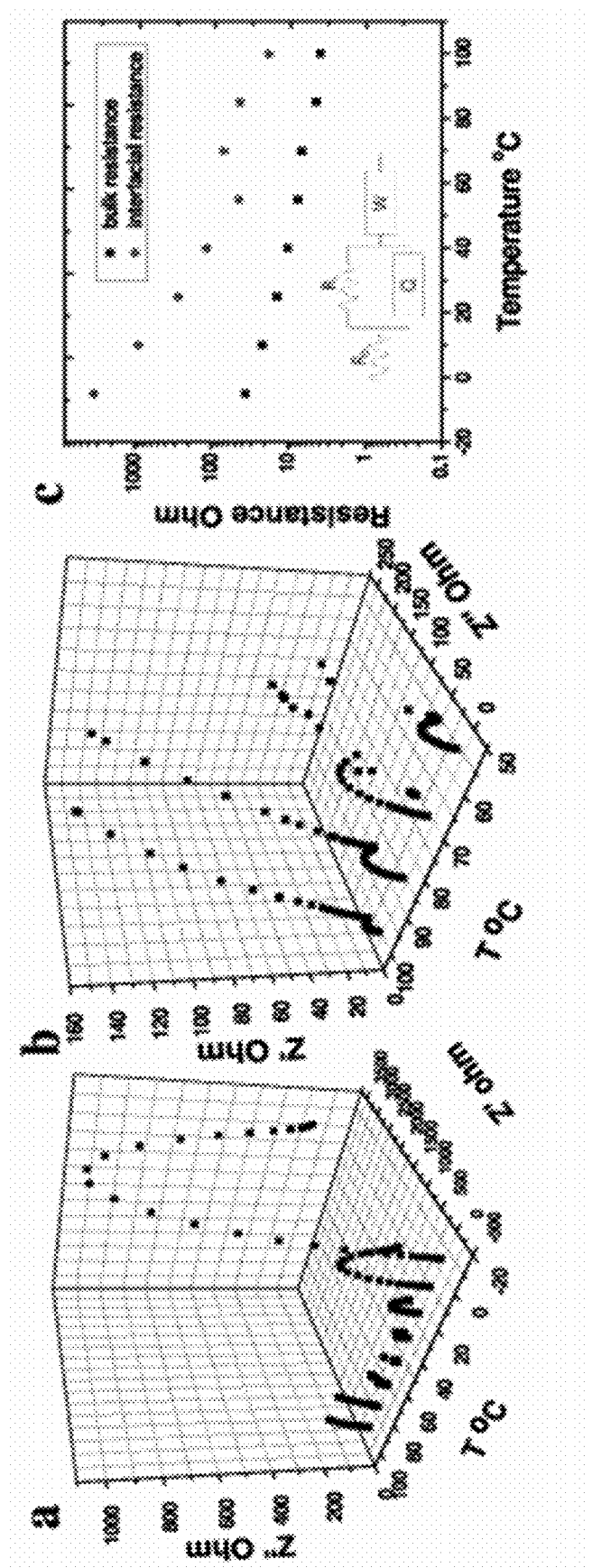
FIG. 9: Impedance spectra of 30 mol % LiF+LiTFSI/PC in alumina/PVDF separator. a, Impedance spectrum versus temperature of 30 mol % LiF+LiTFSI/PC in alumina/PVDF separator. b, A zoom-in impedance spectrum in a from 55° C. to 100° C. c, Extrapolated bulk and interfacial resistance from a; the fitting circuit is shown as inset.

FIG. 5b studies the effect of current density, J, and temperature on $T_{sc}$ for electrolytes containing varying concentrations of LiF, including a PC electrolyte containing 23 vol % of the ionic-liquid methy-3-propylpiperidinium (PP) TFSI known for its exceptional ability to facilitate stable electrodeposition of lithium. It is clear from the figure that both in terms of the variation of $T_{sc}$ with J and the enhancements in lifetime achieved relative to the electrolyte without additives, the LiF-based electrolytes with around 30 mol % LiF perform at least as well as those containing PP TFSI. $T_{sc}$ exhibits a power-law dependence on J, $T_{sc} \sim J^{-m}$, over a wide range of current densities. Power law exponents m obtained from the data are provided in FIG. 15 (Table 2) and show no noticeable dependence on LiF composition. It is also apparent from the figure that 70° C. electrolytes containing LiF exhibit $T_{sc}$ values with little sensitivity to J over a range of current densities, allowing these electrolytes to achieve 100-fold or more enhancements in cell lifetime, relative to the control electrolyte at 25° C. FIG. 5c nicely shows that LiF is not unique and that other lithium halide salts, especially LiBr, are able to significantly extend lifetime of lithium metal electrodes. FIG. 5c further shows that $T_{sc}$ values measured using nanoporous electrolytes (also see FIG. 7) containing LiF are substantially higher than those measured in any of the other systems and are virtually independent of J. The two open red symbols are results for cells where no short-circuiting was observed, but in which the voltage diverged as a result of all of the lithium in the stripping electrode being plated on the other electrode without creating dendrite-induced short circuiting. It is remarkable that these cells show no evidence of short-circuiting at high current densities normally inaccessible in galvanostatic polarization experiments in symmetric Li cells. Post-mortem SEM analysis for these cells are provided as FIG. 8.

Analysis of the electrode-electrolyte interface at different stages of polarization provides additional insight into the role played by LiF. Impedance spectroscopy is a frequency-domain technique that allows the complex resistance or impedance in all components of a cell (electrode, electrolyte, and their interfaces) to be determined as a function of temperature. Impedance spectra before polarization, at steady state, and after cell failure were collected and typical results reported in FIGS. 6a and 6b. Measurements were performed at 25° C. and 70° C. to characterize the effect of temperature. It is readily apparent from the figure that the interfacial impedance (related to the width of the curves) drops noticeably at the point of short-circuiting. Note that it is not possible to fit the impedance spectra by an equivalent circuit model because the surface is no longer uniform once the dendrite starts to form. FIG. 6a compares the impedances of the three stages for 30 mol % LiF+LiTFSI/PC electrolyte at 25° C. and 70° C. Both the bulk (related to the lower intercept of the spectra) and interfacial impedances decrease sharply with only a 45° C. temperature increase.

FIG. 6b displays the impedance spectra for 1 mol %, 3 mol %, 5 mol %, and 10 mol % and 30 mol % LiF+LiTFSI/PC electrolytes individually. At 25° C., the bulk and interfacial impedances are seen to change slightly after the onset of polarization, but as already noted drop substantially after the cell short-circuits. Electrolytes with higher LiF mole fraction have comparable bulk, but measurably lower interfacial impedances at all stages. It suggests that LiF has the ability to enhance the lithium ion diffusion primarily at the electrode/electrolyte interface. When operating at 70° C., spectra at all three stages exhibit similar bulk and interfacial impedances between 5 and 15 $\Omega cm^2$ with negligible dependence of electrolyte composition. It indicates that the impedance is so small that the magnitude is almost similar to that of the short-circuited cell, which consistent with expectations based on the joint density function theory, leads to much larger enhancements in cell lifetime. In general, the lowered impedance created by LiF leads to the extension of the cell lifetime, and the sharply reduced impedance by temperature explains the tremendous enhancement of cell lifetime at high temperature because lithium ions can easily migrate and plate on the negative electrode.

To further evaluate the suitability of LiF-added electrolytes in LMBs, more commonly used electrolytes comprised 1:1 (v:v) EC:DEC with and without LiF were investigated at room temperature using $Li/Li_4Ti_5O_{12}$ (LTO) half-cell. LTO is a no-strain material commercially utilized in electric vehicles and is capable of cycling at both low and high rates for consecutive charge and discharges. In practice, even commercial LTO spinel powder yields a well-defined discharge plateau at 1.55V in carbonate electrolytes, and a discharge capacity close to the theoretical capacities (175 mAh $g^{-1}$) when accommodating lithium and negligible round-trip IR losses. To characterize the effect of LiF on performance of Li/LTO half-cell, thin LTO (15 microns of active material) and thick LTO (64 microns of the active material) were studied in an accelerated procedure employing a very high current density of 2.0 mA $cm^{-2}$ (1 C). For cells based on the thick LTO electrode, an activation process at 0.1 C for 10 cycles was employed prior to the higher current density experiments. A two-hour charge/discharge protocol allows enough lithium to be transported during each cycle to create dendrites that are large enough to short-circuit the cells based on the thick electrode, whereas those based on the more common thin electrodes do not allow sufficient lithium transport to create a dendrite that spans the inter-electrode space.

Figure 10:
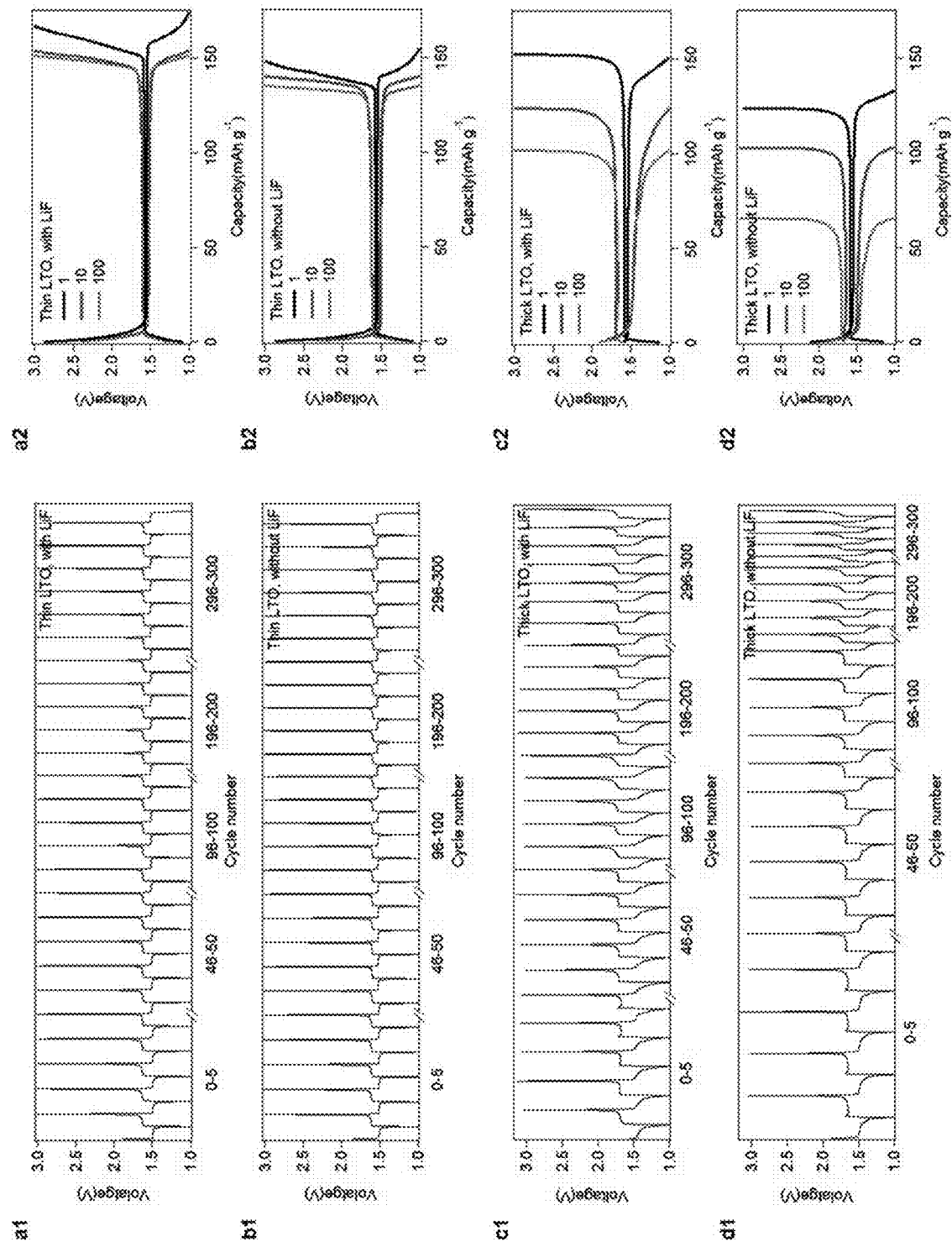
FIG. 10: Charge-discharge characteristics of Li/Li$_4$Ti$_5$O$_{12}$ (Li/LTO) with 30 mol % LiF+LiTFSI/EC:DEC and LiTFSI/EC:DEC electrolytes at room temperature. Thin LTO electrode: Voltage vs. time profile for the first 5 cycles, 46-50 cycles, 96-100 cycles, 196-200 cycles and 296-300 cycles at 1 C rate (0.18 mA cm$^{-2}$) with LiF (a1) and without LiF (b1). About 0.88 μm lithium (charge passed=0.65 C cm$^{-2}$, about 2.2 μm LTO is reacted) is transported from one electrode to the other in each half cycle. Initial, 10$^{th}$, 100$^{th}$ charge-discharge profiles with LiF (a2) and without LiF (b2). Thick LTO electrode: Voltage vs. time profile for the first 5 cycles, 46-50 cycles, 96-100 cycles, 196-200 cycles and 296-300 cycles at 1 C rate (2 mA cm$^{-2}$) with LiF (c1) and without LiF (d1). About 9.8 μm lithium (charge passed=7.2 C cm$^{-2}$, about 24.5 μm LTO is reacted) is transported from one electrode to the other in each half cycle. Initial, 10$^{th}$, 100$^{th}$ charge-discharge profiles with LiF (c2) and without LiF (d2).

FIG. 10(a1-b1) show the voltage profiles obtained using the thin electrodes with and without LiF additive. Unlike the symmetric cells where the current is fixed and the voltage left unconstrained, the voltage range and current are fixed in these experiments. The onset of failure as a result of formation of dendrite shorts or regions of disconnected lithium is then expected to show up in the lifetime or capacity of the cells. It is apparent from FIG. 10(a1) that addition of LiF to the electrolytes increases the discharge capacity, but otherwise does not alter the cycling performance of the cells. The blow-up charge and discharge curves in FIGS. 10(a2) and FIGS. 10(b2) show that the round-trip IR losses in both cells are quite minimal, as expected for LTO. The corresponding results for the thick electrodes are reported in FIGS. 10c and 10d. It is apparent from the voltage profiles in FIG. 10(c1) and FIG. 10(d1) that whereas little change in the Li—F containing electrolytes not only increases the accessible discharge capacity, but substantially improves the cycling stability of the cells. This latter feature is consistent with what one might expect from the earlier observations based on symmetric Li—Li cells which show that Li—F improves the stability of electrodeposition.

Figure 11:
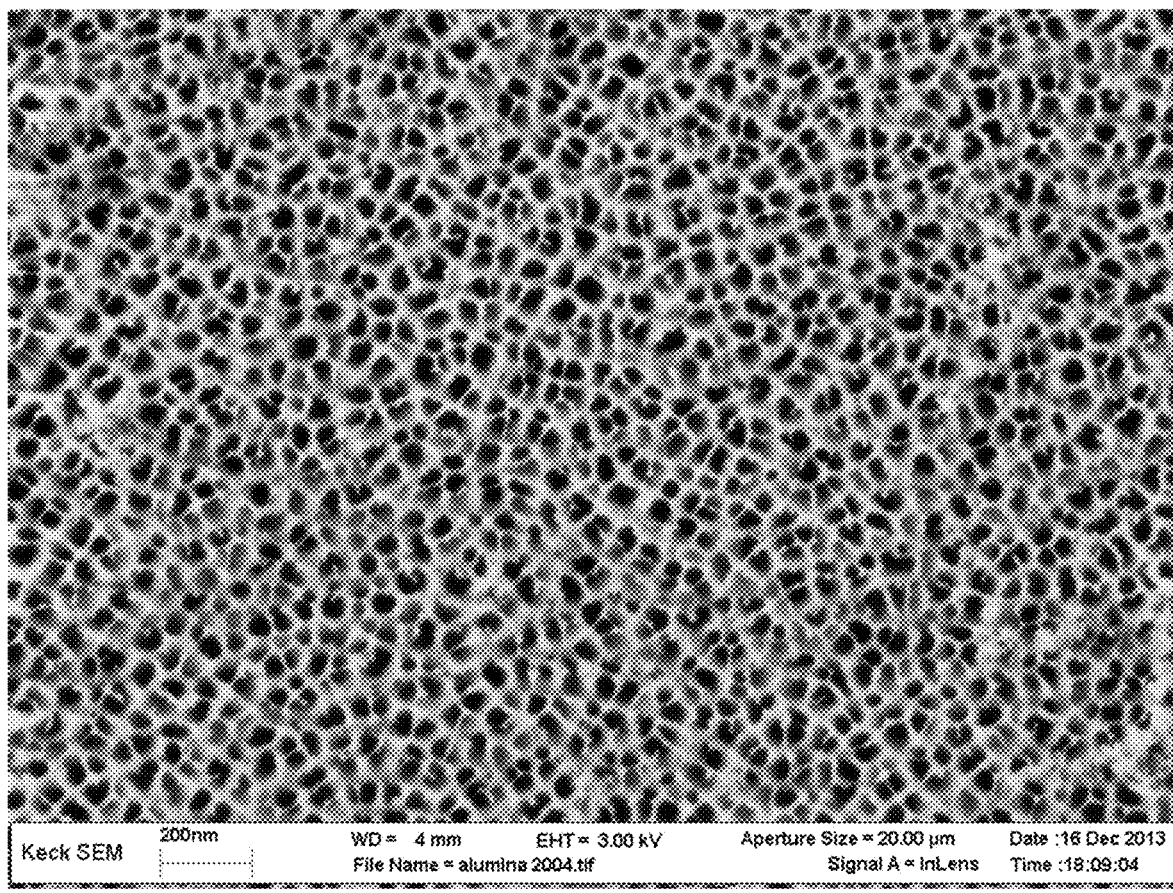
FIG. 11: SEM analysis for nanoporous alumina membranes. The pore size of the alumina film is around 40 nm.
Figure 12:
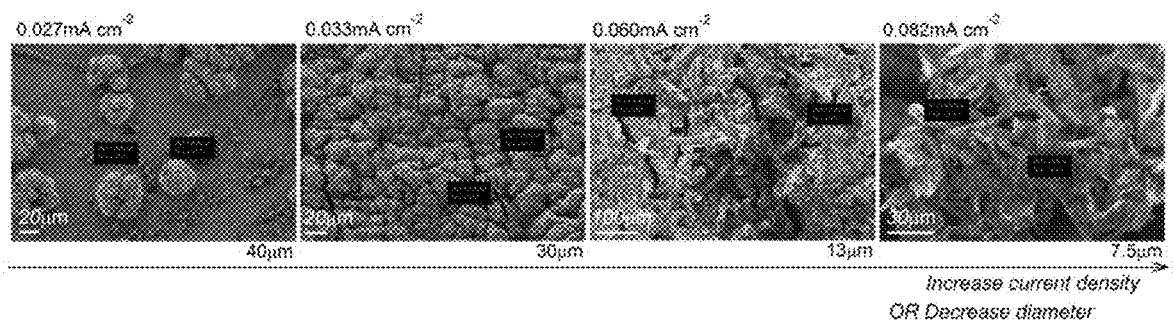
FIG. 12: Post-mortem SEM images of the lithium negative electrodes at various polarization current densities. The average cross section diameters are shown on the bottom right of each picture.

The data of FIG. 11, FIG. 12 and FIG. 13 is included for reference purposes. Additional description of FIG. 11, FIG. 12 and FIG. 13 is recited above in the Brief Description of the Drawings.

In summary, simple addition of lithium halide salts to a conventional low-mechanical-modulus liquid electrolyte such as PC and EC:DEC, leads to dramatic improvements in lifetime of lithium batteries utilizing metallic lithium as anode. In plate-strip symmetric cell studies, Li—Li symmetric cells employing the Li halide salt reinforced electrolytes exhibit no evidence of short circuiting. In more aggressive polarization measurements, infusing the electrolytes in the pores of a nanoporous ceramic yield lithium metal electrodes that exhibit much larger lifetimes than any previously reported room-temperature battery.

Experimental Details for Sodium Metal-Based Battery

A hybrid electrolyte system was employed comprising of a specialized electrolyte system with solvent, salt and additive. The solvent used was a mixture of ethylene carbonate (EC) and propylene carbonate (PC) (both purchased from Sigma Aldrich), in 1:1 volume ratio. EC is a solid at room temperature, it is melted above 40 degree Celsius and mixed with PC in equal volumes and heated overnight at 90 degree Celsius. The solvent was stored in a glove box with molecular sieves for a period of two days in order to remove remnant moisture.

To this solvent, sodium hexafluorophosphate ($NaPF_6$) was added in appropriate amount to prepare different molarity of electrolyte ranging from 1M up to 0.7M. The solution of salt and solvent was stirred overnight to obtain a homogenous electrolyte. Next, the additive of sodium fluoride was added to each batch of electrolyte such that the net molarity of sodium is 1M for all of them. For example, in 100 ml solution of EC:PC, 0.07 moles of NaPF$_6$ and 0.03 moles of NaF was added. The entire mixture of electrolyte-additive was stirred for 12 hours to obtain a turbid final product, since NaF salt is insoluble in the given solvent, thus forming an artificial protective layer in the interface of sodium anode and electrolyte inside a battery.

The assembly of a coin cell was done entirely in a glove box. Two genre of coin cells were manufactured for the testing purpose, (1) a symmetric sodium metal battery where the anode and cathode both comprised of sodium metal, while the electrolyte was EC:PC NaPF$_6$ with sodium fluoride additive. (2) a full battery comprising of sodium metal as anode and a composite of sodium ferrocyanide and carbon as cathode, while EC:PC NaPF$_6$/NaF served as the electrolyte. The batteries with sodium fluoride additive show superior performance in terms of galvanostatic stability compared to other existing sodium batteries. The advantages of the system of electrolyte-additive system are: (1) high conductivity of the electrolyte, (2) high electrochemical stability window, (3) stable and smooth charge and discharge cycle in galvanostatic operations, (4) high short circuit time owing to a stable solid electrolyte interface layer and suppression of dendrite growth (5) low cost of production and easy processing.

In the described embodiments, the electrolyte can be replaced by other solvents like PC, EC:DEC, Tetraglyme, EC:DMC. Also, NaClO$_4$, NaTFSI, NaFSI or any combination of them can replace the salt. Instead of the use of the NaF additive, other sodium halide additives, namely, NaCl, NaBr, NaI can be utilized for the same purpose. The concept of stabilization of electrodeposition using halide additive can be applicable to a molten battery configuration, where a molten sodium metal serve as anode while a solid-state electrolyte replaces the liquid electrolyte.

Figure 16:
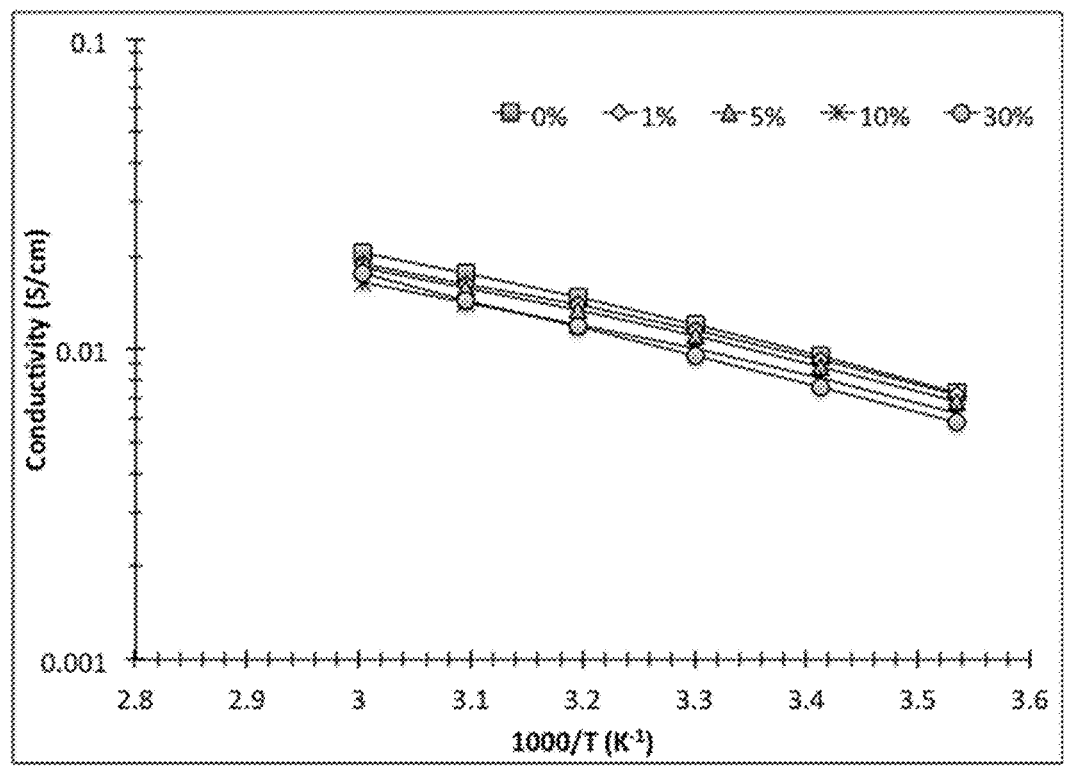
FIG. 16: DC ionic conductivity comparing different molar fraction of NaF additive.

With respect to experimental data obtained for a sodium battery in accordance with this second embodiment FIG. 16 shows DC ionic conductivity comparing different molar fraction of NaF additive. While previous additives used in the literature may result in significant reduction in the ionic conductivity of an electrolyte, the NaF additive in accordance with the embodiments is unique as the conductivity of the electrolyte remains fairly high even by addition of 30% of NaF on a molar basis.

Figure 17:
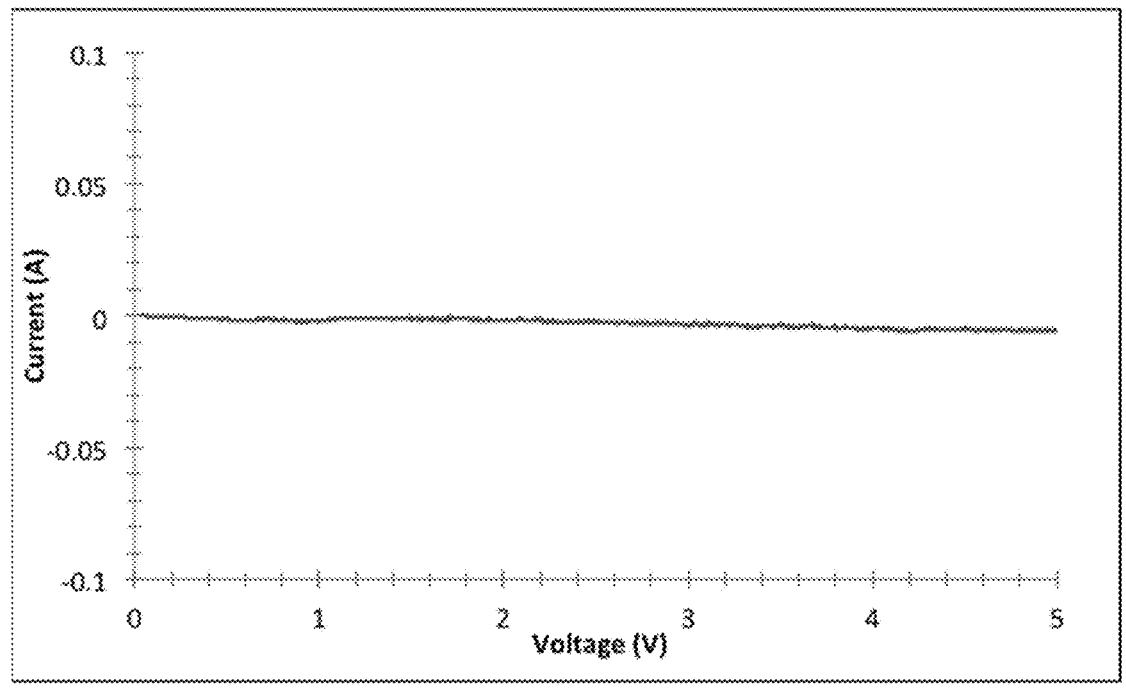
FIG. 17: Cyclic voltammetry result for symmetric sodium cell having NaF additive.

As well FIG. 17 shows a cyclic voltammetry result for symmetric sodium cell having NaF additive. Clearly, it is seen that the stability window of the electrolyte is very high, indicating that the NaF additive is not only a stable compound by itself in a high voltage cathode, it also improves the stability of a liquid electrolyte.

Figure 18:
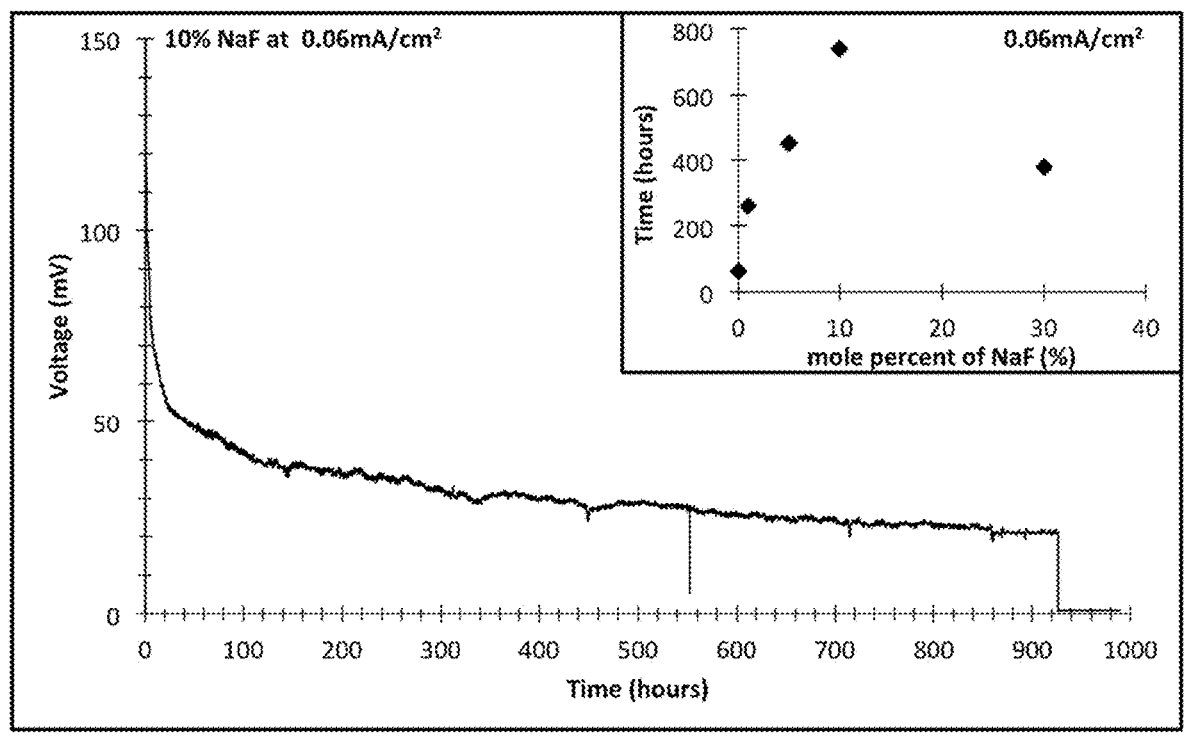
FIG. 18: Galvanostatic polarization measurement for a symmetric sodium cell with 10% mole fraction of NaF additive, at a current density of 0.06 mA/cm2; the inset compares the short circuit time at various mole fractions of NaF additive.

Moreover, FIG. 18 shows galvanostatic polarization measurement for a symmetric sodium cell with 10% mole fraction of NaF additive, at a current density of 0.06 mA/cm2; the inset compares the short circuit time at various mole fractions of NaF additive. The polarization experiment is a relatively harsh method of assessing dendrite induced short circuit in a battery, because, in this technique, metal ions are continuously deposited on a metal electrode until the deposits grow in size capable of shorting. It is remarkable that a sodium electrode in a battery with NaF additive can withstand continuous electrodeposition for over 800 hours. In contrast to a battery without NaF additive the battery fails within 200 hours. Thus the NaF additive can improve the lifetime of a sodium battery by more than four fold.

Figure 19:
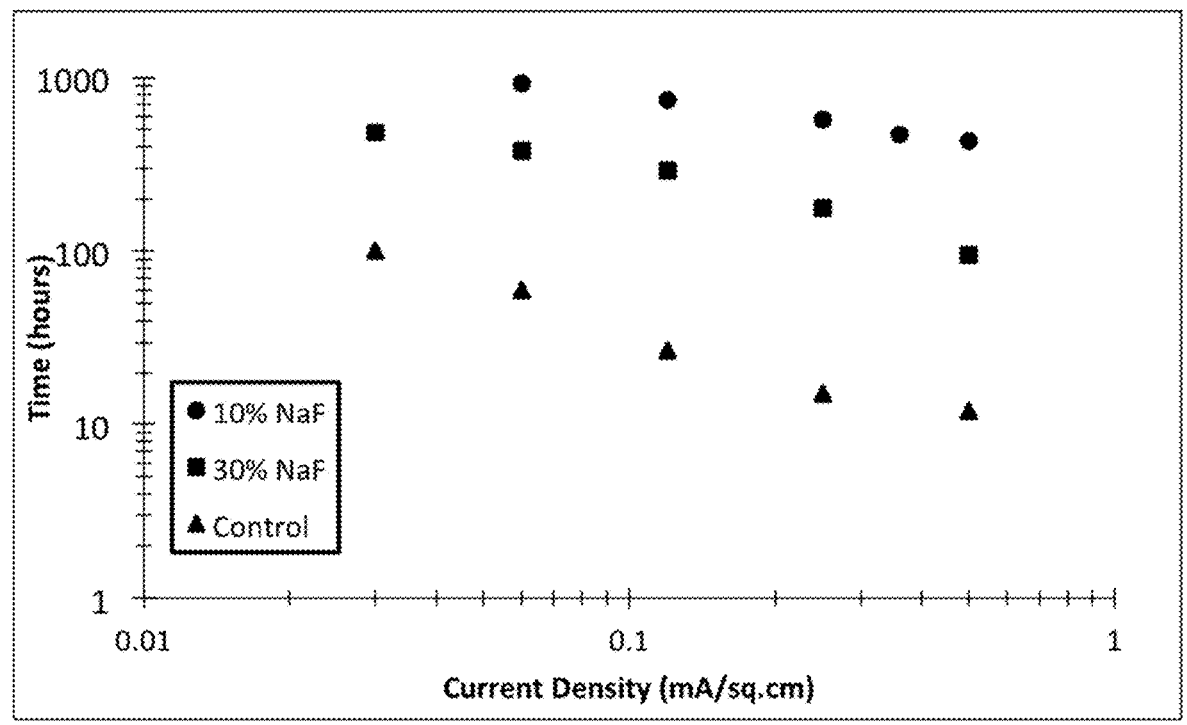
FIG. 19: Chart showing the comparison of short circuit time for different mole fractions of NaF additive at different current density. Measurements with other current densities and mole fractions are ongoing.

FIG. 19 shows a chart showing the comparison of short circuit time for different mole fractions of NaF additive at different current density. It is clear that at various current densities, the cells with NaF additive exhibit high short circuit time compared to cells without NaF additive, here the cells fail within few hours.

Figure 20:
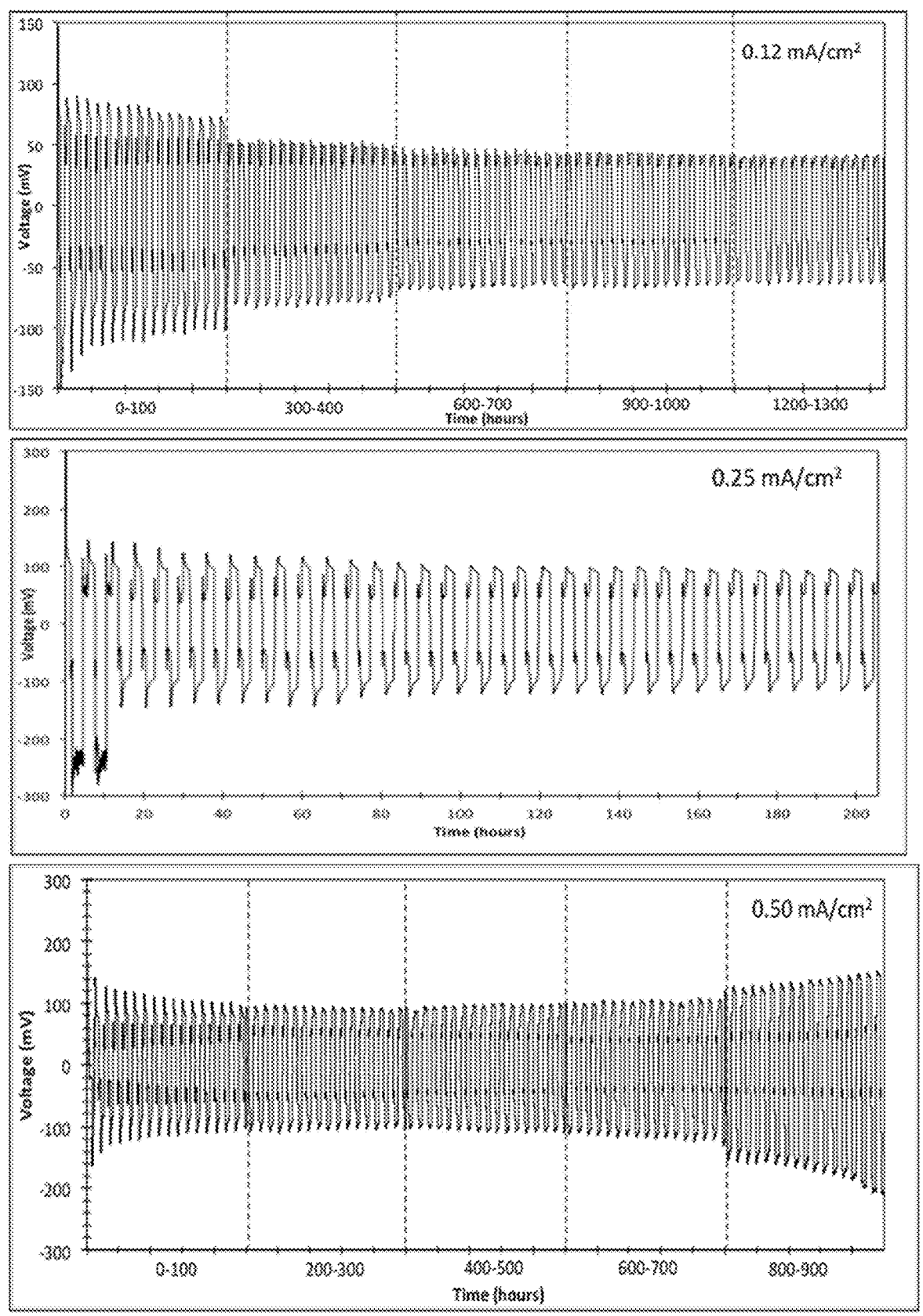
FIG. 20: Galvanostatic strip and plate measurement for symmetric sodium cell with 10% NaF additive at various current densities.

FIG. 20 shows galvanostatic strip and plate measurement for symmetric sodium cell with 10% NaF additive at various current densities. The figure shows the voltage profiles as a function of time, when the cell was charged and discharged for 3 hours each at different current densities. At a low current density of 0.12 mA/cm$^2$, the cell continues to cycle for over 1200 hours, while at a high enough current density of 0.50 mA/cm$^2$, the cell has long lifetime of over 800 hours. The stable voltage profiles indicate that the NaF additive forms a protective layer on the electrode surface preventing any side reaction between the sodium metal and electrolyte.

Figure 21:
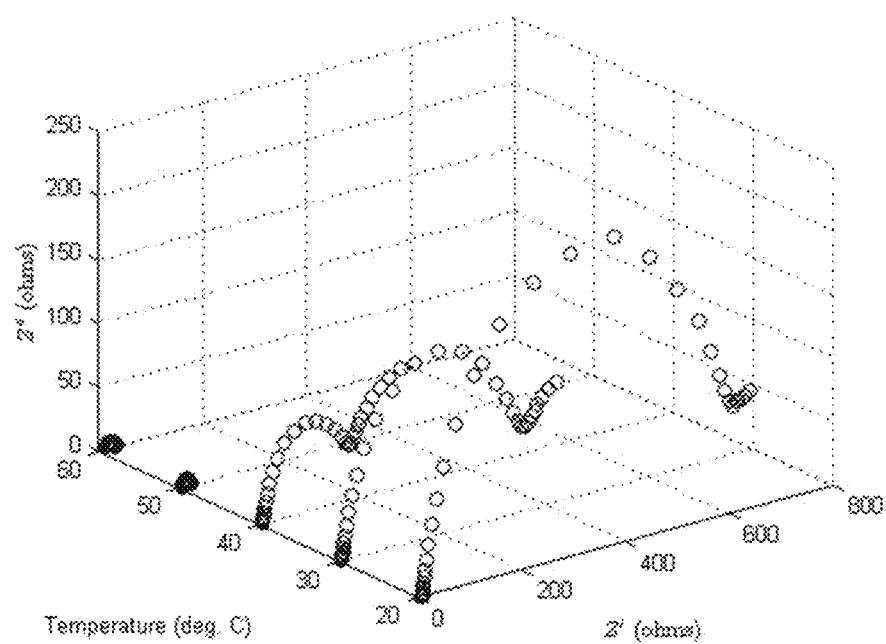
FIG. 21: Impedance spectroscopy curve for symmetric sodium cells with 10% NaF additive at different temperatures.

FIG. 21 shows an impedance spectroscopy curve for symmetric sodium cells with 10% NaF additive at different temperatures. It is seen that at temperature close to room temperature, i.e., 30 deg. C, the interfacial resistance, observed from the width of the semi circle, is relatively low indicating that the NaF layer improves the surface mobility of ions.

Figure 22:
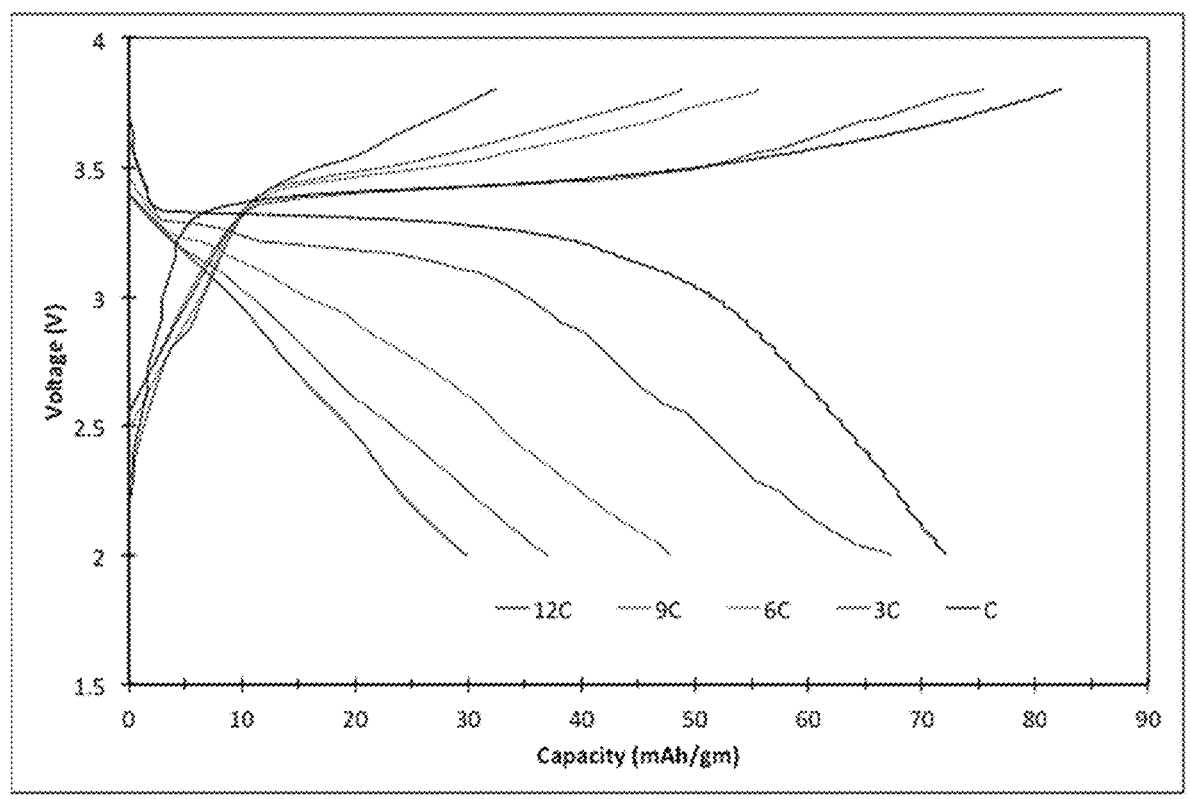
FIG. 22: Galvanostatic charge-discharge cycles for Na4Fe(CN)6-Carbon|10% NaF additive+EC:PC NaPF6| Sodium battery at different C-rates (Theoretical capacity of the cathode is 90 mAh/gm).

FIG. 22 shows galvanostatic charge-discharge cycles for Na$_4$Fe(CN)$_6$-carbon|10% NaF additive+EC:PC NaPF$_6$| Sodium battery at different C-rates (theoretical capacity of the cathode is 90 mAh/gm). It is seen that the NaF additive improves the performance of a half-cell, even at high C-rates. The reason behind the smooth profile is the prevention of side reactions and improved stability of the electrolyte.

Figure 23:
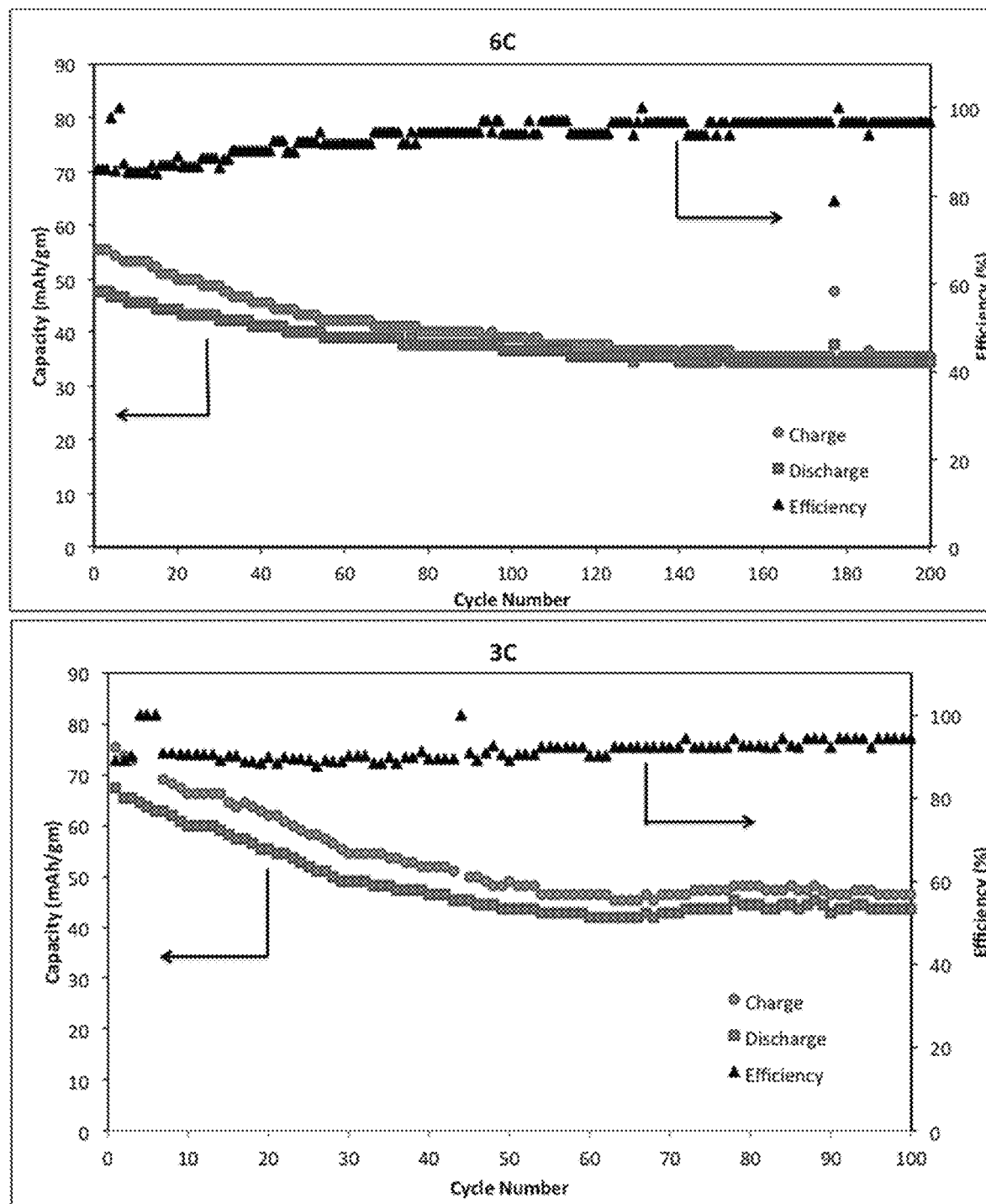
FIG. 23: Cycling Performance of Na4Fe(CN)6-Carbon|10% NaF additive+EC:PC NaPF6| sodium battery.

Finally, FIG. 23 shows cycling Performance of Na$_4$Fe (CN)$_6$-carbon|10% NaF additive+EC:PC NaPF$_6$| sodium battery. The half-cells show impressive cyclability of over 100 cycles at high order C-rates. Thus, it can be concluded that this battery configuration using NaF additive is a good candidate for a commercial battery.

Of the foregoing data the data in FIG. 20 is most supportive of use of the electrolyte of the embodiments.

All references, including publications, patent applications, and patents cited herein are hereby incorporated by reference in their entireties to the same extent as if each reference was individually and specifically indicated to be incorporated by reference and were set forth in its entirety herein.

The use of the terms "a" and "an" and "the" and similar referents in the context of describing the embodiment (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments and does not impose a limitation on the scope of the embodiment unless otherwise claimed.

No language in the specification should be construed as indicating any non-claimed element as essential to the practice of the embodiment.

It will be apparent to those skilled in the art that various modifications and variations can be made to the present embodiment without departing from the spirit and scope of the embodiment. There is no intention to limit the embodiment to the specific form or forms disclosed, but on the contrary, the intention is to cover all modifications, alternative constructions, and equivalents falling within the spirit and scope of the embodiment, as defined in the appended claims. Thus, it is intended that the present embodiment cover the modifications and variations of this embodiment provided they come within the scope of the appended claims and their equivalents.

What is claimed is:

1. A rechargeable battery comprising:
    at least one metal electrode, wherein the metal electrode is an anode;
    an electrolyte comprising:
        an aprotic solvent; and
        a solid electrolyte interface (SEI) layer disposed on at least a portion of the anode metal electrode in contact with the electrolyte formed from a simple halogen containing material, wherein the simple halogen containing material is a metal salt comprising anions selected from fluoride, chloride, bromide iodide, and combinations thereof and the simple halogen containing material is present at 20 to 50 mol % relative to the aprotic solvent and the simple halogen containing material is partially soluble in the aprotic solvent.

2. The rechargeable battery of claim 1 wherein the electrolyte further comprises a metal salt that includes a complex halogen containing anion.

3. The rechargeable battery of claim 1 wherein the aprotic solvent is selected from the group consisting of ethylene carbonate, propylene carbonate, diethyl carbonate and dimethyl carbonate.

4. The rechargeable battery of claim 1 wherein the simple halogen containing material comprises a metal halide salt that includes:
    a metal cation selected from the group consisting of lithium, sodium, aluminum, magnesium, and zinc cations; and
        a halide anion selected from the group consisting of fluoride, chloride, bromide and iodide.

5. The rechargeable battery of claim 4 wherein the metal cation is selected as the same metal as used in the at least one metal electrode.

6. The rechargeable battery of claim 4 wherein the electrolyte consists essentially of the aprotic solvent, the simple halogen containing material and the metal salt that includes the complex halogen containing anion.

7. The rechargeable battery of claim 1 wherein:
    the metal salt that includes the complex halogen containing anion is present at a concentration from about 0.5 to about 2 M with respect to the aprotic solvent.

8. The rechargeable battery of claim 7, wherein the metal salt that includes a complex halogen containing anion is a metal TFSI salt.

9. The rechargeable battery of claim 8, wherein the metal TFSI salt is lithium TFSI.

10. The rechargeable battery of claim 1 further comprising a separator separating the at least one metal electrode from an additional counter electrode.

11. The rechargeable battery of claim 10 wherein the separator comprises a porous ceramic core that separates and is laminated to a pair of permeable polymer material layers.

12. The rechargeable battery of claim 11 wherein the pair of permeable polymer material layers comprises a porous electrically insulating polymer material.

13. The rechargeable battery of claim 12 wherein the separator is saturated with the electrolyte.

14. The rechargeable battery of claim 1 wherein the electrolyte is a liquid electrolyte or a nanoporous solid electrolyte infused with liquid.

15. The rechargeable battery of claim 14 wherein the nanoporous solid electrolyte is an alumina-PVDF membrane.

16. The rechargeable battery of claim 14 wherein the nanoporous solid electrolyte has a pore size of less than about 250 nanometers.

17. The rechargeable battery of claim 1 wherein the rechargeable battery has a cycling ability of at least about 1000 discharging and charging cycles.

18. The rechargeable battery of claim 1 wherein the rechargeable battery has a cycling ability of at least about 1000 discharging and charging hours.

19. The rechargeable battery of claim 1, wherein the rechargeable battery is absent dendrite formation at the at least one metal electrode after at least about 1000 discharging and charging cycles.

20. The rechargeable battery of claim 1, wherein the lifetime of the battery ($T_{sc}$) is 1800 hours or more before succumbing to failure by a dendrite-induced short-circuit.

21. The rechargeable battery of claim 1, wherein the lifetime of the battery ($T_{sc}$), before failure by a dendrite-induced short-circuit, is at least 3 fold more than a rechargeable battery without a simple halogen containing material.

22. The rechargeable battery of claim 1, wherein the lifetime of the battery ($T_{sc}$), before failure by a dendrite-induced short-circuit, is at least 20 fold more than a rechargeable battery without a simple halogen containing material.

23. A metal-based battery electrolyte composition comprising:
    an aprotic solvent;
    a simple halogen containing material present at 5 to about 40 mole percent of the aprotic solvent; and
    a metal salt that includes a complex halogen containing anion present at 0.5 to 2 M with respect to the aprotic solvent.

24. The metal-based battery electrolyte composition of claim 23 wherein the aprotic solvent is selected from the group consisting of ethylene carbonate, propylene carbonate, diethyl carbonate and dimethyl carbonate.

25. The metal-based battery electrolyte composition of claim 23 wherein the simple halogen containing material is selected from the group consisting of a metal halide salt, an elemental diatomic halogen, a non-metal halide, a hydrogen halide, a mixed halogen halide and a noble gas halide.

26. The composition of claim 25, wherein the simple halogen containing material is a metal salt comprising anions selected from, fluoride, chloride, bromide iodide, and combinations thereof.

27. The metal-based battery electrolyte composition of claim 23 wherein the metal salt that includes the complex halogen containing anion is selected from the group consisting of a metal TFSI salt, a metal tetrafluoroborate salt and a metal hexafluorophosphate salt.

28. The metal-based battery electrolyte composition of claim 23 wherein the simple halogen containing material is substantially insoluble within the aprotic solvent.

29. The metal-based battery electrolyte composition of claim 23 wherein the simple halogen containing material is substantially soluble within the aprotic solvent.

30. The metal-based battery electrolyte composition of claim 23, wherein the metal salt that includes a complex halogen containing anion is a metal TF SI salt.

31. The metal-based battery electrolyte composition of claim 30, wherein the metal TFSI salt is lithium TFSI.

32. The metal-based battery electrolyte composition of claim 23, wherein the rechargeable battery is absent dendrite formation at the at least one metal electrode after at least about 1000 discharging and charging hours.

33. A method for operating the rechargeable battery of claim 1, comprising:
    discharging a secondary battery comprising:
        at least one metal electrode, wherein the metal electrode is an anode;
        an electrolyte comprising:
            an aprotic solvent; and
            a solid electrolyte interface (SEI) layer disposed on at least a portion of the anode metal electrode in contact with the electrolyte formed from a simple halogen containing material; and
    recharging the discharged secondary battery to provide a recharged secondary battery absent dendrite formation at the at least one metal electrode.

34. The method of claim 33 wherein the recharged secondary battery is absent dendrite formation at the at least one metal electrode after at least about 1000 discharging and charging cycles.

35. The method of claim 33 wherein the recharged secondary battery is absent dendrite formation at the at least one metal electrode after at least about 1000 discharging and charging hours.

36. The method of claim 33 wherein the aprotic solvent is selected from the group consisting of ethylene carbonate, propylene carbonate, diethyl carbonate and dimethyl carbonate.

37. The method of claim 33 wherein the simple halogen containing material comprises a metal halide salt that includes:
    a metal cation selected from the group consisting of lithium and sodium metals; and
    a halide anion selected from the group consisting of fluoride, chloride, bromide and iodide halides.

38. The method of claim 37 wherein the metal cation is selected as the same metal as used in the at least one metal electrode.

39. The method of claim 33 wherein the simple halogen containing material is present at a concentration from about 5 to about 40 molar percent of the solvent.

40. The method of claim 33 wherein the electrolyte consists essentially of the solvent and the simple halogen containing material.

41. The method of claim 33 wherein the recharged secondary battery comprises a separator separating the at least one metal electrode from an additional counter electrode, wherein:
    the separator comprises a porous ceramic core component that separates and is laminated to a pair of permeable electrically insulating polymer material layers; and
    the separator is saturated with the electrolyte.

42. The method of claim 33, wherein the simple halogen containing material is a metal salt comprising anions selected from fluoride, chloride, bromide iodide, and combinations thereof.

43. The method of claim 33 wherein the electrolyte further comprises a metal salt that includes a complex halogen containing anion.

* * * * *